US012597696B2

(12) United States Patent
Lu et al.

(10) Patent No.: US 12,597,696 B2
(45) Date of Patent: Apr. 7, 2026

(54) PACKAGE ANTENNA APPARATUS AND WIRELESS COMMUNICATION APPARATUS

(71) Applicant: Huawei Technologies Co., Ltd., Shenzhen (CN)

(72) Inventors: Lei Lu, Shanghai (CN); Jian Liang, Shanghai (CN); Xiuyin Zhang, Guangzhou (CN); Jinxu Xu, Guangzhou (CN); Huiyang Li, Guangzhou (CN); Lian Yang, Guangzhou (CN); Wanli Zhan, Guangzhou (CN); Zongzhi Gao, Shanghai (CN); Weixi Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 787 days.

(21) Appl. No.: 17/843,582

(22) Filed: Jun. 17, 2022

(65) Prior Publication Data

US 2022/0320712 A1 Oct. 6, 2022

Related U.S. Application Data

(63) Continuation of application No. PCT/CN2019/126453, filed on Dec. 19, 2019.

(51) Int. Cl.
*H01Q 1/00* (2006.01)
*H01P 1/203* (2006.01)
(Continued)

(52) U.S. Cl.
CPC ....... *H01Q 1/2283* (2013.01); *H01P 1/20372* (2013.01); *H01Q 5/50* (2015.01); *H01Q 9/0414* (2013.01)

(58) Field of Classification Search
CPC ...... H01Q 1/2283; H01Q 5/50; H01Q 9/0414; H01Q 21/08; H01Q 1/36; H01Q 21/00;
(Continued)

(56) References Cited

U.S. PATENT DOCUMENTS

| | | | |
|---|---|---|---|
| 10,992,059 | B2 | 4/2021 | Zhu et al. |
| 2006/0125578 | A1 | 6/2006 | Akale et al. |

(Continued)

FOREIGN PATENT DOCUMENTS

| | | | |
|---|---|---|---|
| CN | 103944525 | A | 7/2014 |
| CN | 105070699 | A | 11/2015 |

(Continued)

OTHER PUBLICATIONS

Chatterjee, J. et al., "Dual Band Bandpass Filter using Stub Loaded Stepped Impedance Resonator for Wireless Application," 2012 1st International Conference on Emerging Technology Trends in Electronics, Communication and Networking, 2012, 3 pages.

(Continued)

*Primary Examiner* — Ping Y Hsieh
(74) *Attorney, Agent, or Firm* — Slater Matsil, LLP

(57) ABSTRACT

A package antenna apparatus including a package substrate, wherein an antenna array is disposed on the package substrate, and a transceiver chip coupled to the antenna array, where the transceiver chip is fastened to the package substrate, and the transceiver chip has a first pad and a second pad, and a filter disposed on the package substrate, where the filter comprises an input port and an output port, the input port is coupled to the first pad of the transceiver chip, the output port is coupled to the second pad of the transceiver chip, and the filter is configured to filter a signal of the transceiver chip that is input through the input port, and is further configured to output a filtered signal to the transceiver chip through the output port.

20 Claims, 13 Drawing Sheets

(51) Int. Cl.
*H01Q 1/22* (2006.01)
*H01Q 5/50* (2015.01)
*H01Q 9/04* (2006.01)

(58) Field of Classification Search
CPC ............. H01P 1/20372; H01P 1/20363; H01P 1/20381; H01L 23/3121; H01L 23/49816; H01L 23/552; H01L 2223/6616; H01L 2223/6655; H01L 2223/6677; H01L 23/49822; H01L 23/49827; H01L 23/5386; H01L 23/66; H01L 25/16; H01L 23/64; H04B 1/40
See application file for complete search history.

(56) References Cited

U.S. PATENT DOCUMENTS

| | | | |
|---|---|---|---|
| 2010/0164651 A1 | 7/2010 | Erb | |
| 2013/0037924 A1 | 2/2013 | Lee et al. | |
| 2015/0244548 A1* | 8/2015 | Weissman | H04L 27/0002 455/42 |
| 2015/0348936 A1* | 12/2015 | Lin | H01L 24/19 257/659 |
| 2017/0126202 A1* | 5/2017 | Shapoury | H01P 1/203 |
| 2018/0205155 A1* | 7/2018 | Mizunuma | H04B 7/00 |
| 2018/0277527 A1* | 9/2018 | Yota | H01L 23/3114 |
| 2019/0189606 A1* | 6/2019 | Kamphuis | H01L 25/50 |
| 2019/0304936 A1* | 10/2019 | Shaul | H01L 24/20 |
| 2022/0189864 A1* | 6/2022 | Yazdani | H01L 25/18 |

FOREIGN PATENT DOCUMENTS

| | | |
|---|---|---|
| CN | 107146781 A | 9/2017 |
| CN | 207009621 U | 2/2018 |
| CN | 108428983 A | 8/2018 |
| CN | 108847516 A | 11/2018 |
| CN | 109300881 A | 2/2019 |
| CN | 109687165 A | 4/2019 |
| CN | 109712947 A | 5/2019 |
| KR | 20100066266 A * | 6/2010 |
| WO | 2018031191 A1 | 2/2018 |

OTHER PUBLICATIONS

Chu, H. et al., "A Filtering Dual-Polarized Antenna Subarray Targeting for Base Stations in Millimeter-Wave 5G Wireless Communications," IEEE Transactions on Components, Packaging and Manufacturing Technology, vol. 7, No. 6, Jun. 2017, 10 pages.

Duan, W. et al., "Dual-Polarized Filtering Antenna With High Selectivity and Low Cross Polarization," IEEE Transactions on Antennas and Propagation, vol. 64, No. 10, Oct. 2016, 9 pages.

Guan, X. et al., "Compact and High-Isolation Diplexer Using Dual-Mode Stub-Loaded Resonators," IEEE Microwave and Wireless Components Letters, vol. 24, No. 6, Jun. 2014, 3 pages.

Hong, J.S. et al., "Microstrip Filters for RF/Microwave Applications," A Wiley-Interscience Publication, John Wiley & Sons, Inc., Jun. 2001, 476 pages.

Li, Y.C. et al., "Bandpass Filter Using Discriminating Coupling for Extended Out-of-Band Suppression," IEEE Microwave and Wireless Components Letters, vol. 20, No. 7, Jul. 2010, 3 pages.

Mao, C.H. et al., "Multimode Resonator-Fed Dual-Polarized Antenna Array with Enhanced Bandwidth and Selectivity," IEEE Transactions on Antennas and Propagation, vol. 63, No. 12, Dec. 2015, 8 pages.

"TP for TR 38.820: scope of NR UE RF," Source: Huawei, HiSilicon, Agenda Item: 11.4.7, Document for: Approval, 3GPP TSG-RAN WG4 Meeting #93, R4-1916108, Reno, USA, Nov. 18-22, 2019, 2 pages.

Tummala, R.R. et al., "Gigabit Wireless: System-on-aPackage Technology," Proceedings on the IEEE, vol. 92, No. 2, Feb. 2004, 12 pages.

Zhang, X.Y. et al., "High-Gain Filtering Patch Antenna Without Extra Circuit," IEEE Transactions on Antennas and Propagation, vol. 63, No. 12, Dec. 2015, 6 pages.

* cited by examiner

PACKAGE ANTENNA APPARATUS AND WIRELESS COMMUNICATION APPARATUS

CROSS-REFERENCE TO RELATED APPLICATIONS

This application is a continuation of International Application No. PCT/CN2019/126453, filed on Dec. 19, 2019, which is hereby incorporated by reference in its entirety.

TECHNICAL FIELD

This application relates to the field of integrated circuits, and in particular, to a package antenna apparatus and a wireless communication apparatus.

BACKGROUND

A plurality of frequency bands above 24 GHz are defined in a fifth generation (5G) new radio (NR) standard and a wireless gigabit (WiGIG) standard. Because wavelengths of signals on these frequency bands are close to a millimeter-wave level, these frequency bands may also be considered as millimeter-wave frequency bands. Signals transmitted on these frequency bands are very sensitive to link loss, and a length of a signal cable has great impact on system performance. To compensate for attenuation of a millimeter-wave signal, a wireless communication system that supports millimeter-wave transmission usually also needs to use a phased antenna array technology. The phased antenna array includes an antenna array and a plurality of radio frequency front-end channels, where the antenna array includes a plurality of antennas, and the radio frequency front-end channels are connected to these antennas.

In a third generation (3G) or fourth generation (4G) mobile communication system, in a radio frequency front-end architecture of a terminal, one or more filters are disposed between a port of a radio frequency front-end channel and an antenna. These filters can provide a function of selecting a frequency band, help reduce frequency interference, and help improve frequency usage. Commonly used filters include a surface acoustic wave (SAW) filter, a bulk acoustic wave (BAW) filter, and a film bulk acoustic resonator (FBAR) filter. These filters have a large size, and are usually disposed on a printed circuit board (PCB) inside the terminal. In a millimeter-wave frequency band, if a conventional radio frequency front-end architecture of 3G or 4G simply continues to be used, a quantity and a size of filters bring a great challenge to design and manufacturing of an integrated circuit chip and a terminal.

SUMMARY

This application provides a new package antenna apparatus, to improve package integration of a chip, and/or improve overall performance of the chip.

According to a first aspect, this application discloses a package antenna apparatus. The package antenna apparatus includes: a package substrate, where an antenna array is disposed on the package substrate, and a transceiver chip coupled to the antenna array, where the transceiver chip is fastened to the package substrate. The transceiver chip includes a first pad and a second pad. A filter is further disposed on the package substrate. The filter includes an input port and an output port. The input port is coupled to the first pad of the transceiver chip. The output port is coupled to the second pad of the transceiver chip. The filter is configured to filter a signal of the transceiver chip that is input through the input port, and output a filtered signal to the transceiver chip through the output port.

According to the foregoing technical solution, the filter is disposed on the package substrate, to improve integration of a package antenna. In addition, because the filter filters a signal transmitted inside the transceiver chip, a filtering requirement of a multichannel port of the transceiver chip coupled to the antenna array can be reduced. This reduces a quantity of required filters or lowers a performance indicator of the filter, and helps improve overall performance of the chip or further improve package integration of the chip.

It should be understood that the filter may be disposed on the package substrate according to two solutions provided in this application. In a first solution, the filter is disposed on a material (for example, a metal layer and a dielectric layer) of the package substrate. In a second solution, an existing filter is fastened to a surface of the package substrate or inside the package substrate. The two solutions may have different impact on design and manufacturing of the filter. For example, in the first solution, the filter is disposed on the material of the package substrate. This can further reduce costs of the filter and further improve integration. However, this solution may impose some limitations on design and manufacturing of the filter, and depends on a manufacturing process of the package substrate or a package structure. In the second solution, the existing filter is selected. This can improve diversity and flexibility of the filter.

Similarly, the antenna array may also be disposed on the package substrate according to two solutions. For example, an antenna is disposed on the material (for example, the metal layer and the dielectric layer) of the package substrate, and includes a part or all of an antenna structure such as a radiating element and a feeding unit of the antenna. Alternatively, the antenna array is fastened to the package substrate through molding or welding. In this case, the antenna array may be an independent component, for example, a patch antenna.

In addition, in the package structure, the transceiver chip may be in a die form, or may be in a package form. Correspondingly, the pad (for example, the first pad and the second pad) of the chip may be a pad of a die of the chip, or may be a pad of a package of the chip. The pad of the package of the chip may be fastened to the package substrate in a manner such as welding, or the pad of the die of the chip may be fastened to the package substrate in a manner such as molding.

In a possible implementation, the filter is fastened inside the package substrate or to the surface of the package substrate through molding or welding. According to the foregoing technical solution, selection flexibility of the filter can be improved, to improve overall performance of the chip. For example, the filter may be an independent component, and does not depend on design and manufacturing of the package substrate.

In a possible implementation, the package substrate includes a plurality of metal layers. The filter is disposed in the plurality of metal layers. According to the foregoing technical solution, the filter is implemented in the metal layers of the package substrate. This further improves package integration and also reduces costs of the filter.

In a possible implementation, the plurality of metal layers include a first part of metal layer and a second part of metal layer. The second part of metal layer is located below the first part of metal layer. A plurality of radiating elements of the antenna array are disposed in the first part of metal layer. The filter is disposed in the second part of metal layer. The transceiver chip is fastened below the second part of metal layer. According to the foregoing technical solution, the filter is disposed below the radiating elements, and the transceiver chip is disposed below the filter, so that the filter is closer to the transceiver chip. This reduces a loss caused by a connection between the transceiver chip and the filter.

In a possible implementation, the filter includes a filter circuit and a metal ground. The filter circuit and the metal ground are disposed at different metal layers of the package substrate. The metal ground includes a first metal ground and a second metal ground. The first metal ground is disposed at a metal layer above a metal layer at which the filter circuit is located. The second metal ground is disposed at a metal layer below the metal layer at which the filter circuit is located. According to the foregoing technical solution, a structure with one metal ground on the upper side and the other metal ground on the lower side is introduced, to improve isolation of the filter in the package substrate and reduce interference caused by an interference signal in the package substrate to the filter.

In a possible implementation, a metal via is further provided in the metal layer at which the filter is located. The metal via is configured to connect the first metal ground to the second metal ground. The metal via, the first metal ground, and the second metal ground form a metal cavity. According to the foregoing technical solution, the metal cavity is introduced, to improve isolation of the filter in the package substrate and reduce impact of the interference signal in the package substrate on the filter.

In a possible implementation, the filter circuit includes a transmission circuit. One end of the transmission circuit is connected to the input port. The other end of the transmission circuit is connected to the output port. A transmission line structure is disposed on the transmission circuit. The transmission line structure is bent between the input port and the output port. According to the foregoing technical solution, a bent structure better reduces a size of the filter.

In a possible implementation, the transmission line structure disposed on the transmission circuit includes a first transmission line stub, a second transmission line stub, and a third transmission line stub. The first transmission line stub and the third transmission line stub are coupled to the second transmission line stub through a slot, and are symmetrical with respect to the second transmission line stub. According to the foregoing technical solution, a stopband and a passband of the filter are implemented through the symmetrical stubs and slot coupling.

In a possible implementation, the transmission line structure disposed on the transmission circuit includes a first transmission line circuit and a second transmission line circuit. The first transmission line circuit and the second transmission line circuit are each formed by connecting a plurality of open-circuited transmission line stubs in parallel between head-to-tail connected transmission lines. The first transmission line circuit and the second transmission line circuit are connected in parallel. The first transmission line circuit and the second transmission line circuit are separately located at different metal layers. According to the foregoing technical solution, a layered transmission line structure is introduced, to reduce the size of the filter.

In a possible implementation, the filter circuit further includes a resonator. The resonator and the transmission line structure are separately located at different metal layers. According to the foregoing technical solution, the resonator and the transmission line structure are disposed at different metal layers, to implement inter-layer coupling between the resonator and the transmission line structure and adjust a location of a transmission zero of the filter circuit.

In a possible implementation, the resonator includes a hole patch or a metal patch. The hole patch or the metal patch is disposed at a metal layer between a metal layer at which the metal ground is located and a metal layer at which the transmission circuit is located. According to the foregoing technical solution, the resonator with the hole patch or the metal patch is introduced, to adjust a transmission zero of the filter.

In a possible implementation, the transceiver chip includes: a receiver, a transmitter, a splitter/combiner unit separately coupled to the receiver and the transmitter, and a plurality of radio frequency front-end channels coupled to the splitter/combiner unit. The plurality of radio frequency front-end channels of the transceiver chip are coupled to the antenna array. According to the foregoing technical solution, the splitter/combiner unit is separately coupled to the receiver and the transmitter, so that the radio frequency front-end channels coupled to the plurality of radiating elements can be integrated into the transceiver chip. According to the foregoing technical solution, the transceiver chip may split a plurality of signals from the transmitter to each antenna port in a transmit direction and combine a plurality of signals from each antenna port to the receiver in a receive direction.

In a possible implementation, the first pad is coupled to the transmitter. The second pad is coupled to the splitter/combiner unit. The filter is coupled between the transmitter and the splitter/combiner unit through the first pad and the second pad. According to the foregoing technical solution, the filter is coupled between the transmitter and the splitter/combiner unit, to reduce interference caused by the transmitter to the radio frequency front-end channels.

In a possible implementation, the first pad is coupled to the receiver. The second pad is coupled to the splitter/combiner unit. The filter is coupled between the receiver and the splitter/combiner unit through the first pad and the second pad. According to the foregoing technical solution, the filter is coupled between the receiver and the splitter/combiner unit, to reduce interference caused by the radio frequency front-end channels to the receiver.

According to a second aspect, this application further provides a wireless communication apparatus, including a baseband chip and the package antenna apparatus in a possible implementation. The baseband chip is coupled to the transceiver chip in the package antenna apparatus. According to the foregoing technical solution, the wireless communication apparatus can extract and process digital information of a received or transmitted signal through coupling between the transceiver chip and the baseband chip.

In a possible implementation, the wireless communication apparatus further includes a printed circuit board. The package antenna apparatus is fastened to the printed circuit board. According to the foregoing technical solution, the package antenna apparatus is fastened to the printed circuit board, so that the package antenna apparatus can be assembled with more circuit modules.

In a possible implementation, the wireless communication apparatus further includes a rear cover and a frame. The package structure is fastened to a side that faces toward the rear cover or a side that faces toward the frame. According to the foregoing technical solution, the package antenna apparatus is disposed on the side that faces toward the rear cover, to reduce interference caused by a display apparatus to the package antenna apparatus.

According to a third aspect, this application provides a wireless communication apparatus, including a receiver, a transmitter, a filter, an antenna array, a splitter/combiner unit separately coupled to the receiver and the transmitter, a plurality of radio frequency front-end channels coupled to the splitter/combiner unit, and the antenna array coupled to the plurality of radio frequency front-end channels. The filter is coupled between the transmitter and the splitter/combiner unit.

According to the foregoing technical solution, the filter is disposed between the transmitter and the splitter/combiner unit, to reduce interference caused by the transmitter to the radio frequency front-end channels and improve signal quality of the wireless communication apparatus. In addition, this reduces a quantity of required filters for the antenna array and the radio frequency front-end channels or lowers a performance indicator of the filter, and helps improve overall performance of the wireless communication apparatus.

In a possible implementation, the radio frequency front-end channel includes a selector, a power amplifier (PA) and a low noise amplifier (LNA) that are coupled to the selector, and a phase shifter (PS) that is coupled to the PA and the LNA. According to the foregoing technical solution, the radio frequency front-end channel has functions of transmit/receive duplex and flexible phase adjustment, to implement phased array sweeping with a transceiving function.

In a possible implementation, the selector of the radio frequency front-end channel includes a quarter-wave transmission line that is disposed on a receive branch of the LNA and that has a grounding switch. According to the foregoing technical solution, a time division duplex (TDD) function with a low transmission loss can be implemented.

In a possible implementation, the wireless communication apparatus further includes: a package substrate, where the antenna array is disposed on the package substrate, and a transceiver chip integrating the receiver, the transmitter, the splitter/combiner unit, and the radio frequency front-end channels. The transceiver chip is fastened to the package substrate. The transceiver chip includes a first pad and a second pad. The filter is further disposed on the package substrate. The filter includes an input port and an output port. The filter is coupled between the transmitter and the splitter/combiner unit through the first pad and the second pad. According to the foregoing technical solution, the filter and the antenna array are disposed on the package substrate, to improve integration of the wireless communication apparatus.

It should be understood that, in the solution provided in this application, the pad of the chip may be a pad of a package layer of the chip, or may be a pad of a die of the chip. The chip may be fastened to the package substrate in a similar manner such as welding through the pad of the package layer, or the die of the chip may be fastened to the package substrate in a similar manner such as molding.

In a possible implementation, the filter is fastened inside the package substrate or to the surface of the package substrate through molding or welding. According to the foregoing technical solution, selection flexibility of the filter can be improved, to improve overall performance of the chip. For example, the filter may be an independent component, and does not depend on design and manufacturing of the package substrate.

In a possible implementation, the package substrate includes a plurality of metal layers. The filter is disposed in the plurality of metal layers. According to the foregoing technical solution, the filter is implemented in the metal layers of the package substrate. This further improves integration of the wireless communication apparatus and reduces costs of the wireless communication apparatus.

It should be understood that the filter in the third aspect may further have another possible implementation. For details, refer to features of the filter in the possible implementations of the first aspect or the fourth aspect. Details are not described herein again.

According to a fourth aspect, this application provides a filter. The filter includes a filter circuit and a metal ground. The filter circuit and the metal ground are disposed at different metal layers. The metal ground includes a first metal ground and a second metal ground. The first metal ground is disposed at a metal layer above a metal layer at which the filter circuit is located. The second metal ground is disposed at a metal layer below the metal layer at which the filter circuit is located. The filter circuit includes a transmission circuit. One end of the transmission circuit is connected to the input port of the filter. The other end of the transmission circuit is connected to the output port of the filter. A transmission line structure is disposed on the transmission circuit. The transmission line structure is bent between the input port and the output port. According to the foregoing technical solution, one metal ground on the upper side, the other metal ground on the lower side, and the transmission circuit with the bent transmission line are introduced, to improve an anti-interference capability of the filter and further reduce a size of the filter.

In a possible implementation, a metal via is further provided in the filter. The metal via is configured to connect the first metal ground to the second metal ground. The metal via, the first metal ground, and the second metal ground form a metal cavity. According to the foregoing technical solution, the metal cavity is introduced, to improve isolation of the filter and reduce impact of external interference signal on the filter.

In a possible implementation, the transmission line structure disposed on the transmission circuit includes a first transmission line stub, a second transmission line stub, and a third transmission line stub. The first transmission line stub and the third transmission line stub are coupled to the second transmission line stub through a slot, and are symmetrical with respect to the second transmission line stub. According to the foregoing technical solution, a stopband and a passband of the filter are implemented through the symmetrical stubs and slot coupling.

In a possible implementation, the transmission line structure disposed on the transmission circuit includes a first transmission line circuit and a second transmission line circuit. The first transmission line circuit and the second transmission line circuit are each formed by connecting a plurality of open-circuited transmission line stubs in parallel between head-to-tail connected transmission lines. The first transmission line circuit and the second transmission line circuit are connected in parallel. The first transmission line circuit and the second transmission line circuit are separately located at different metal layers. According to the foregoing technical solution, the layered transmission line structure is introduced, to reduce the size of the filter.

In a possible implementation, the filter circuit further includes a resonator. The resonator and the transmission line structure are separately located at different metal layers. According to the foregoing technical solution, the resonator and the transmission line structure are disposed at different metal layers, to implement inter-layer coupling between the resonator and the transmission line structure and adjust a location of a transmission zero of the filter circuit.

In a possible implementation, the resonator includes a hole patch or a metal patch. The hole patch or the metal patch is disposed at a metal layer between a metal layer at which the metal ground is located and a metal layer at which the transmission circuit is located. According to the foregoing technical solution, the resonator with the hole patch or the metal patch is introduced, to adjust a transmission zero of the filter.

It should be understood that, in the solution provided in this application, the package antenna apparatus may be an antenna in package (AIP), an antenna on package (AOP), or an antenna module. The antenna may be disposed inside a package, or may be disposed on a surface of a package. The antenna may be, but not limited to, a patch antenna, or may be a pole antenna using a via in the package, for example, a monopole or a dipole, or may be a combination of the pole antenna and the patch antenna, or may be in another form.

It should be understood that, in the solution provided in this application, the wireless communication apparatus may be a wireless communication device, or may be some components in the wireless communication device, for example, a chip, a chip combination, or an integrated circuit product such as a module including a chip. The wireless communication device may be a computer device that supports a wireless communication function.

Specifically, the wireless communication device may be a terminal such as a smartphone, or may be a radio access network device such as a base station. In terms of functions, chips for wireless communication may be classified into a baseband chip and a radio frequency chip. The baseband chip is also referred to as a modem or a baseband processing chip. The radio frequency chip is also referred to as a transceiver chip, a radio frequency transceiver, or a radio frequency processing chip. Therefore, the wireless communication apparatus may be a single chip, or may be a combination of a plurality of chips, for example, a system chip, a chip platform, or a chipset.

The system chip is also referred to as a system on a chip (SoC), or referred to as a SoC chip for short. It may be understood that a plurality of chips are packaged together to form a larger chip. For example, the baseband chip may be further packaged in the SoC chip. The chip platform or the chipset may be understood as a plurality of chips that need to be used together. The plurality of chips are usually independently packaged, but the chips need to cooperate with each other during operation to jointly complete a wireless communication function. For example, the baseband chip (or the SoC chip integrated with the baseband chip) and the radio frequency chip are usually independently packaged, but need to be used together.

Figure 6:
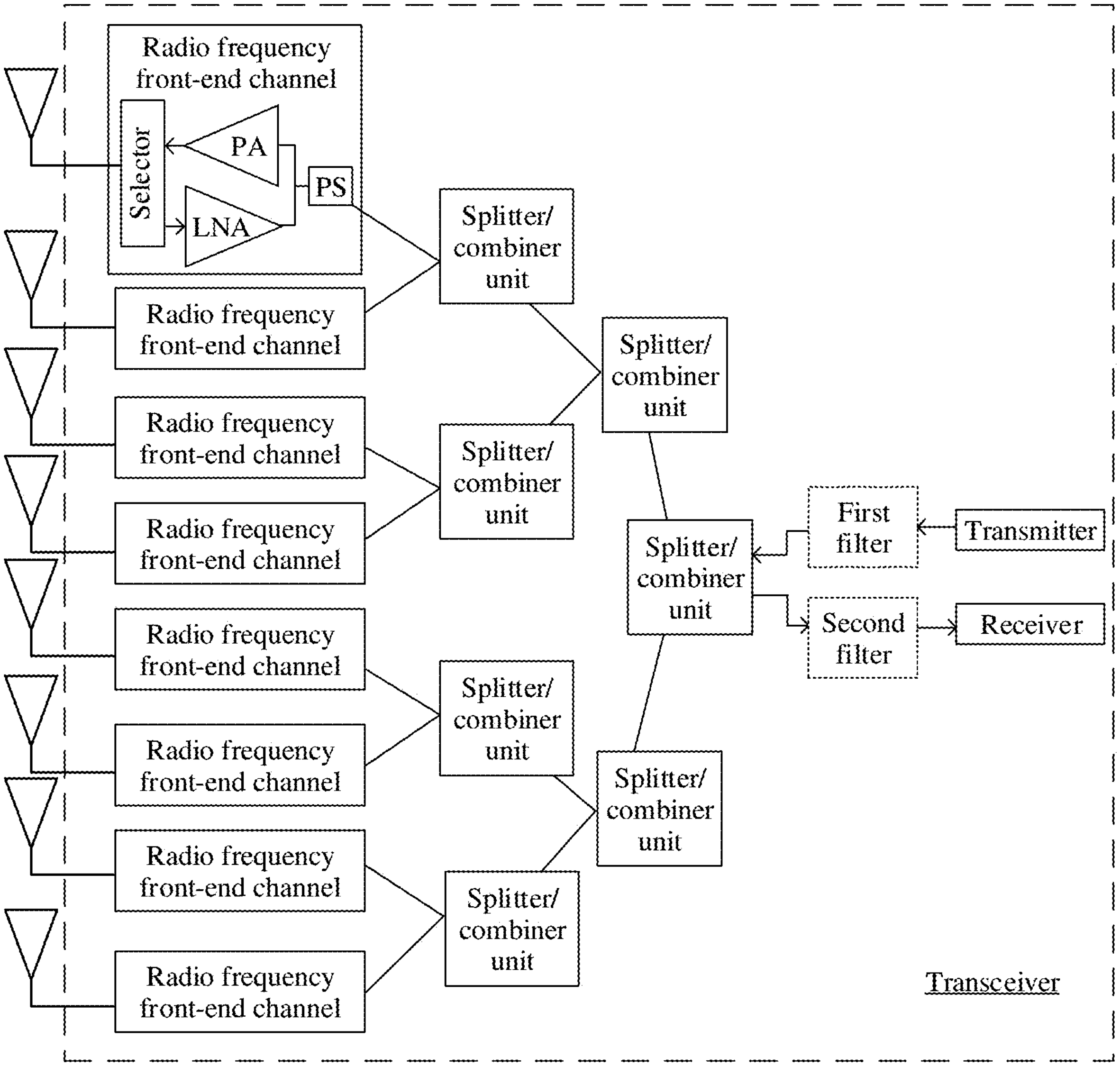
Figure 7:
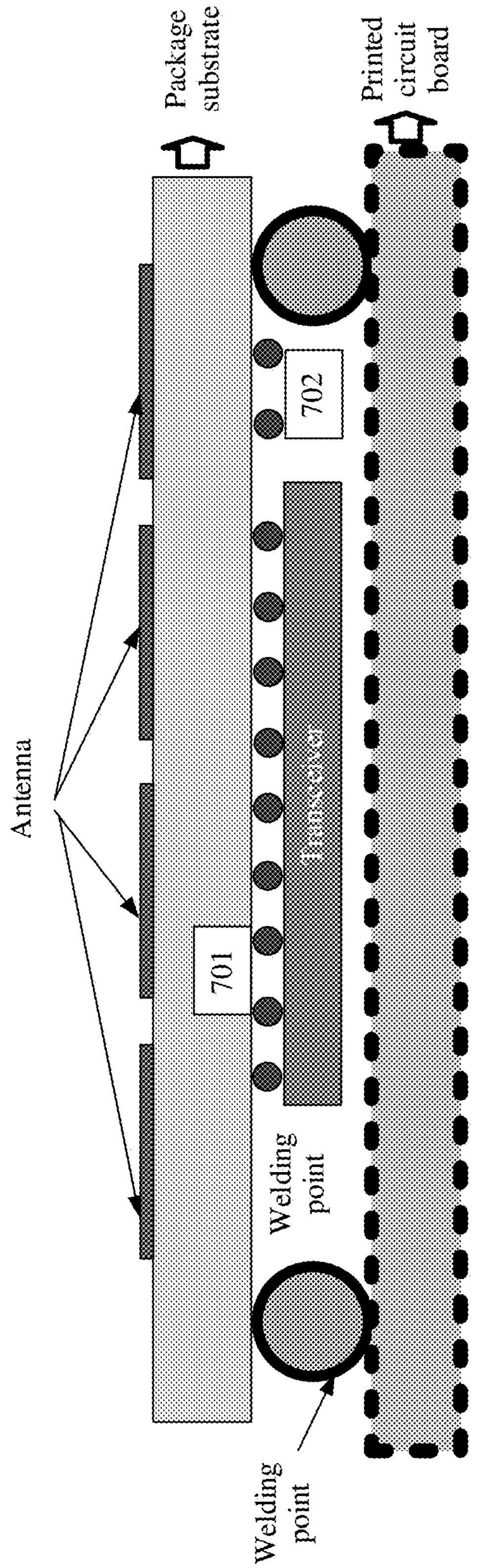
Figure 8:
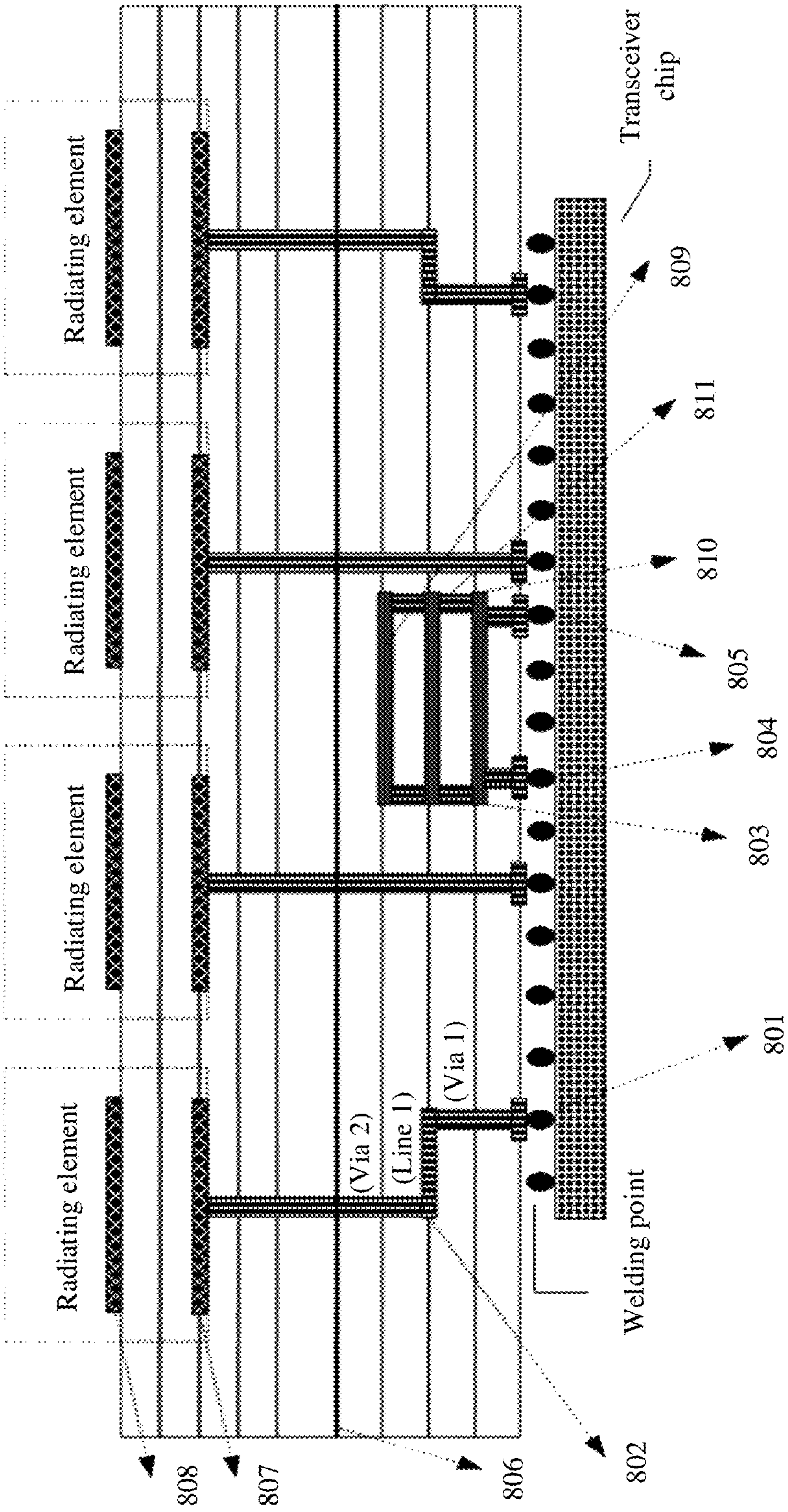
Figure 9:
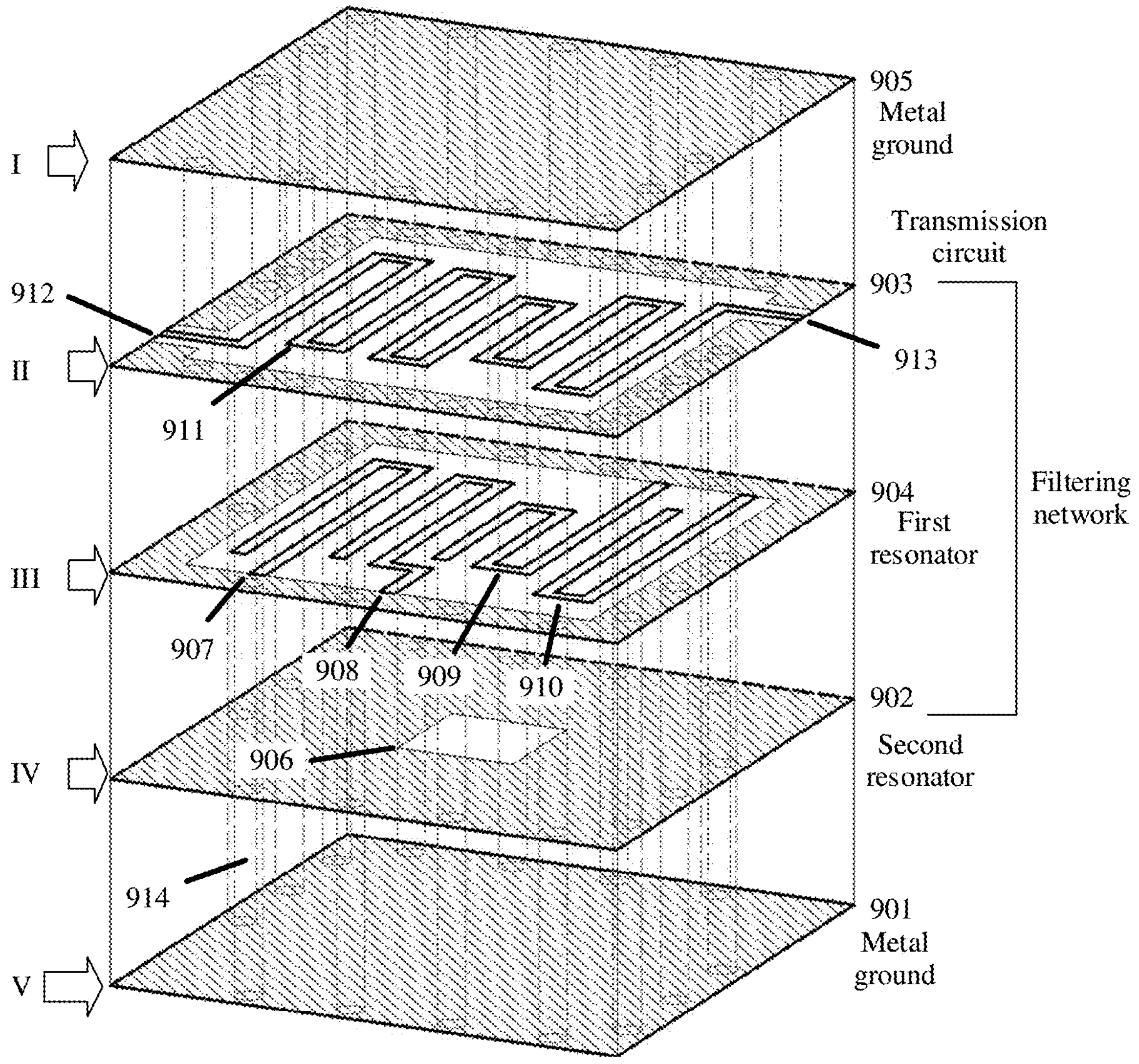
Figure 10:
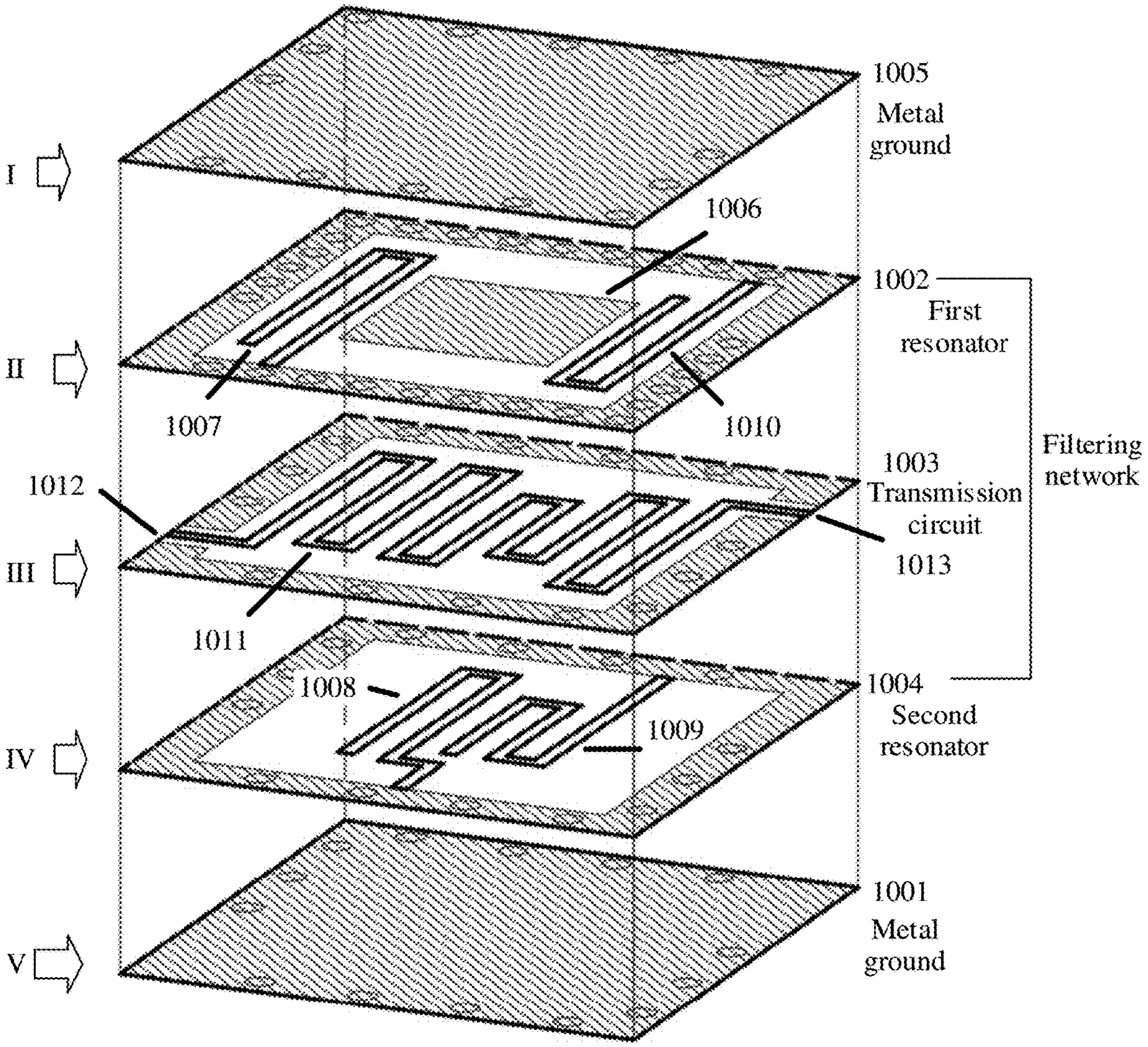
Figure 11:
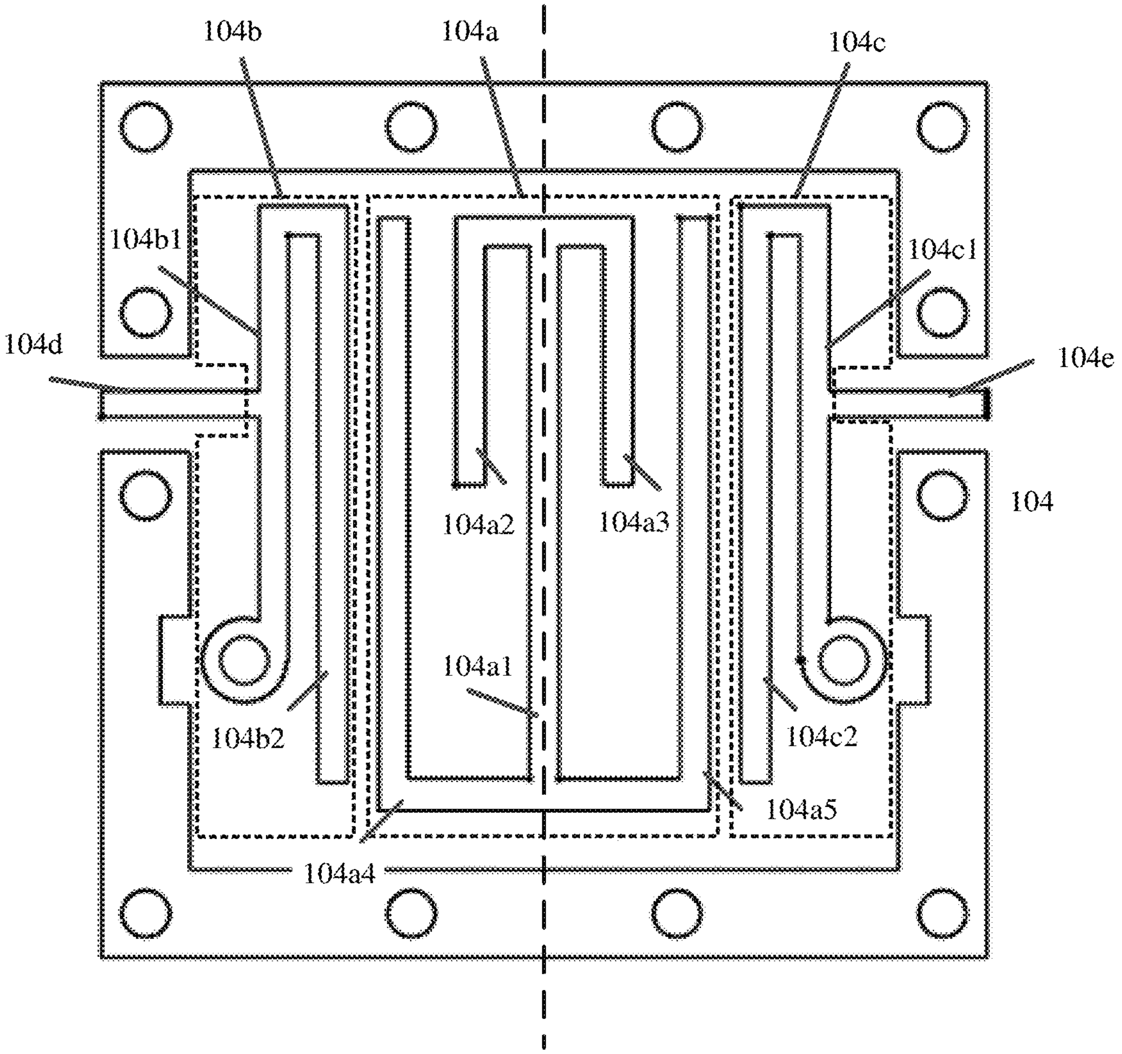
Figure 12:
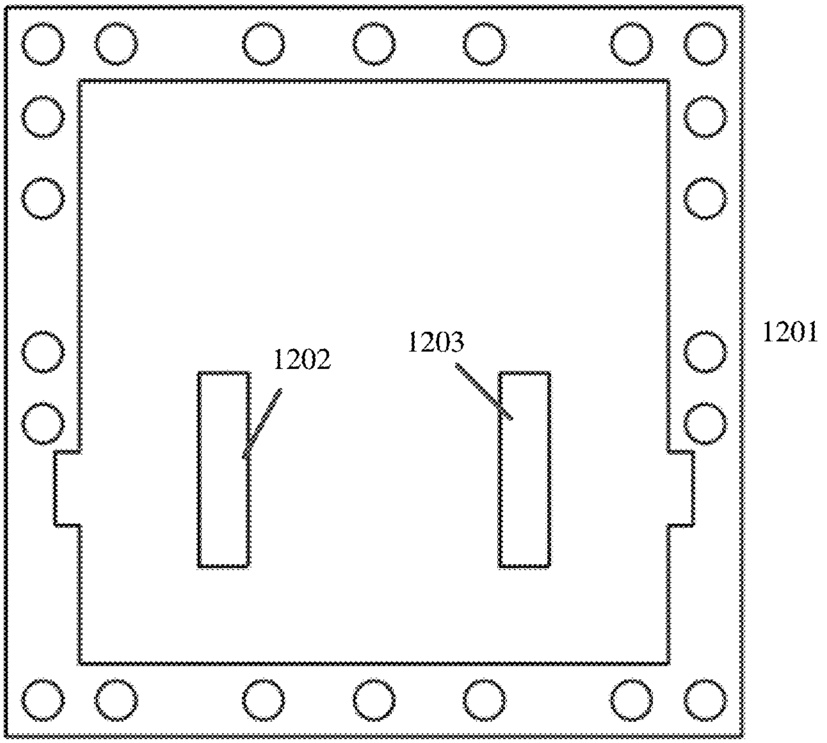
Figure 13:
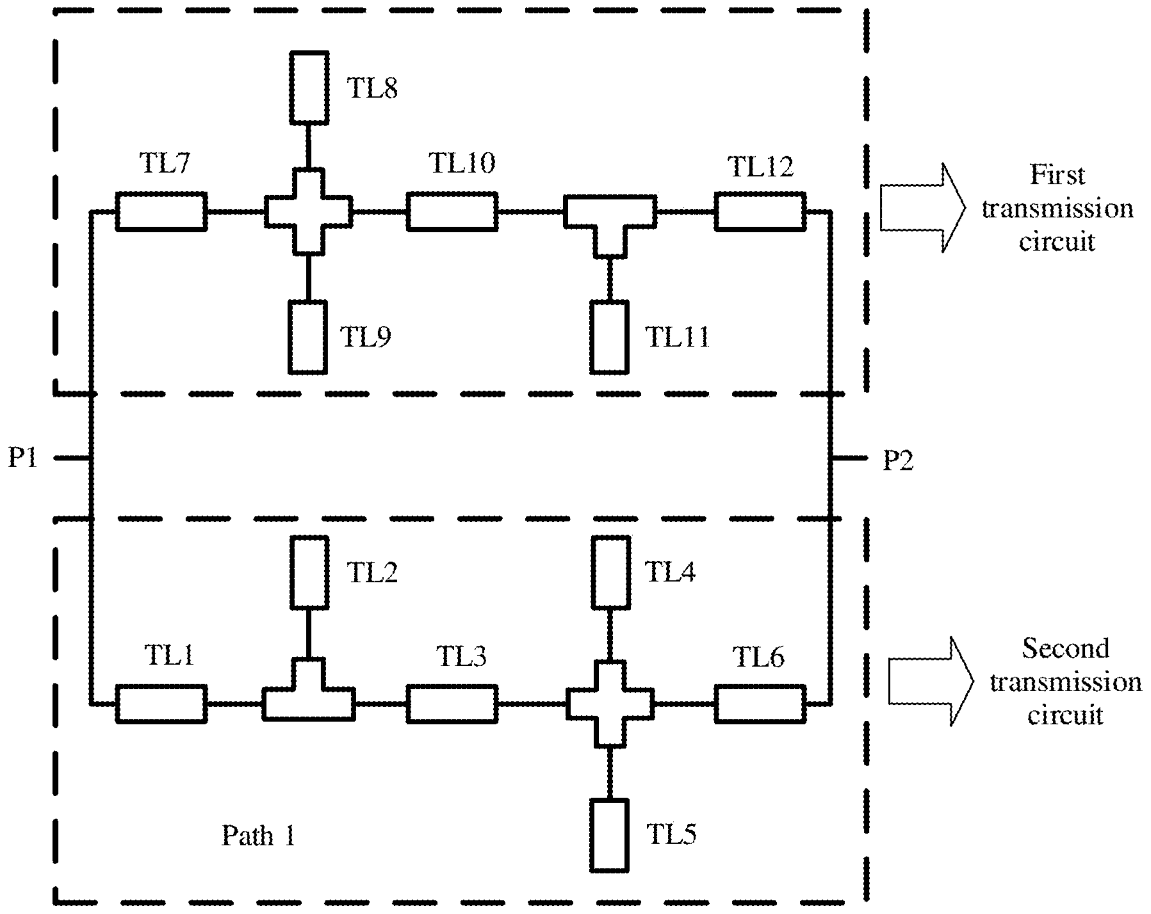

FIG. **5*a*** is a schematic diagram of a structure of a welded package antenna apparatus according to an embodiment of this application;

FIG. **5*b*** is a schematic diagram of a structure of a molded package antenna apparatus according to an embodiment of this application;

FIG. 6 is a function diagram of another transceiver according to an embodiment of this application;

FIG. 7 is a schematic diagram of a structure of another welded package antenna apparatus according to an embodiment of this application;

FIG. 8 is a schematic diagram of a structure of another package antenna apparatus according to an embodiment of this application;

FIG. 9 is a schematic diagram of a structure of a filter according to an embodiment of this application;

FIG. 10 is a schematic diagram of a structure of another filter according to an embodiment of this application;

FIG. 11 is a schematic diagram of an implementation structure of a transmission circuit according to an embodiment of this application;

FIG. 12 is a schematic diagram of an implementation structure of a resonator according to an embodiment of this application; and FIG. 13 is a schematic diagram of a structure of another transmission circuit according to an embodiment of this application.

DETAILED DESCRIPTION OF ILLUSTRATIVE EMBODIMENTS

The following further describes technical solutions provided in this application with reference to the accompanying drawings and embodiments. It should be understood that a system structure and a service scenario provided in embodiments of this application are mainly intended to explain some possible implementations of the technical solutions in this application, and should not be construed as a unique limitation on the technical solutions in this application. A person of ordinary skill in the art may know that, as a system evolves and an updated service scenario emerges, the technical solutions provided in this application are still applicable to same or similar technical problems.

It should be understood that, in the following description of specific embodiments of the technical solutions provided in embodiments of this application, some repeated parts may not be described again, but it should be considered that the specific embodiments are mutually referenced and may be combined with each other.

In a wireless communication system, devices may be classified into devices that provide a wireless network service and devices that use a wireless network service. The devices that provide the wireless network service are devices that form a wireless communication network, and may be briefly referred to as network devices) or network elements. The network devices are typically owned by a carrier or an infrastructure provider, and are operated or maintained by these vendors. The network devices may further be classified into a radio access network (RAN) device and a core network (CN) device. The RAN device typically includes a base station (BS).

It should be understood that the base station may also sometimes be referred to as a wireless access point (AP) or a transmission reception point (TRP). Specifically, the base station may be a universal NodeB (gNB) in a 5G new radio (NR) system or an evolved NodeB (eNB) in a 4G long term evolution (LTE) system. Base stations may be classified into a macro base station or a micro base station based on different physical forms or transmit powers of the base stations. The micro base station is also sometimes referred to as a small base station or a small cell.

The device that uses the wireless network service may be briefly referred to as a terminal. The terminal can establish a connection to the network device, and provide a specific wireless communication service for a user based on a service of the network device. It should be understood that, because a relationship between a terminal and a user is closer, the terminal is sometimes referred to as user equipment (UE), a subscriber unit (SU), or customer-premises equipment (CPE). In addition, compared with a base station that is usually placed at a fixed position, the terminal usually moves along with the user, and is also sometimes referred to as a mobile station (MS). In addition, some network devices such as a relay node (RN) or a wireless router may also sometimes be considered as terminals because the network devices have a UE identity or belong to the user.

Specifically, the terminal may be a mobile phone, a tablet computer, a laptop computer, a wearable device (for example, a smartwatch, a smart band, a smart helmet, or smart glasses), other devices that have a wireless access capability, for example, an intelligent vehicle, a mobile wireless router, various internet of things (JOT) devices including various smart home devices (such as a smart meter and a smart home appliance) and smart city devices (such as a security or monitoring device and an intelligent road transportation facility), and the like.

For ease of description, the technical solutions in embodiments of this application are described in detail by using the base station and the terminal as examples in this application.

Figure 1:
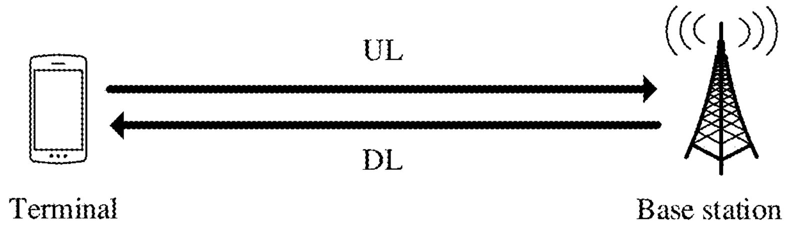
FIG. 1 is a schematic diagram of a structure of a wireless communication system according to an embodiment of this application.

FIG. 1 is a schematic diagram of a structure of a wireless communication system according to an embodiment of this application. As shown in FIG. 1, the wireless communication system includes a terminal and a base station. Based on different transmission directions, a transmission link from the terminal to the base station is referred to as an uplink (UL), and a transmission link from the base station to the terminal is referred to as a downlink (DL). Similarly, data transmission over the uplink may be briefly referred to as uplink data transmission or uplink transmission, and data transmission over the downlink may be briefly referred to as downlink data transmission or downlink transmission.

In the wireless communication system, the base station may provide communication coverage for a specific geographical area by using an integrated or external antenna device. One or more terminals in a communication coverage area of the base station may be connected to the base station. One base station may manage one or more cells. Each cell has one identity. The identity is also referred to as a cell identity (cell ID). From a perspective of a radio resource, a cell is a combination of a downlink radio resource and an uplink radio resource (optional) that is paired with the downlink radio resource.

It should be understood that the wireless communication system may comply with a wireless communication standard in the 3rd generation partnership project (3GPP), or may comply with another wireless communication standard, for example, a wireless communication standard in the 802 series standards (for example, 802.11, 802.15, or 802.20) of the Institute of Electrical and Electronics Engineers (IEEE). Although FIG. 1 shows only one base station and one terminal, the wireless communication system may alternatively include other quantities of terminals and base stations. In addition, the wireless communication system may further include another network device, for example, a core network device.

The terminal and the base station need to know configurations predefined by the wireless communication system, including a radio access technology (RAT) supported by the system and a configuration of a radio resource stipulated by the system, for example, basic configurations of a radio frequency band and a carrier. The carrier is a frequency range that complies with a stipulation of the system. The frequency range may be determined jointly based on a center frequency of the carrier (denoted as a carrier frequency) and a bandwidth of the carrier. The configurations predefined by the system may be used as a part of a standard protocol for the wireless communication system, or may be determined through interaction between the terminal and the base station. Content of a related standard protocol may be prestored in memories of the terminal and the base station, or reflected as hardware circuits or software code of the terminal and the base station.

In the wireless communication system, the terminal and the base station each support one or more same RATs, for example, 5G NR, 4G LTE, or a RAT for a future evolved system. Specifically, the terminal and the base station each use a same air interface parameter, a same coding scheme, a same modulation scheme, and the like, and communicate with each other based on the radio resource stipulated by the system.

Figure 2:
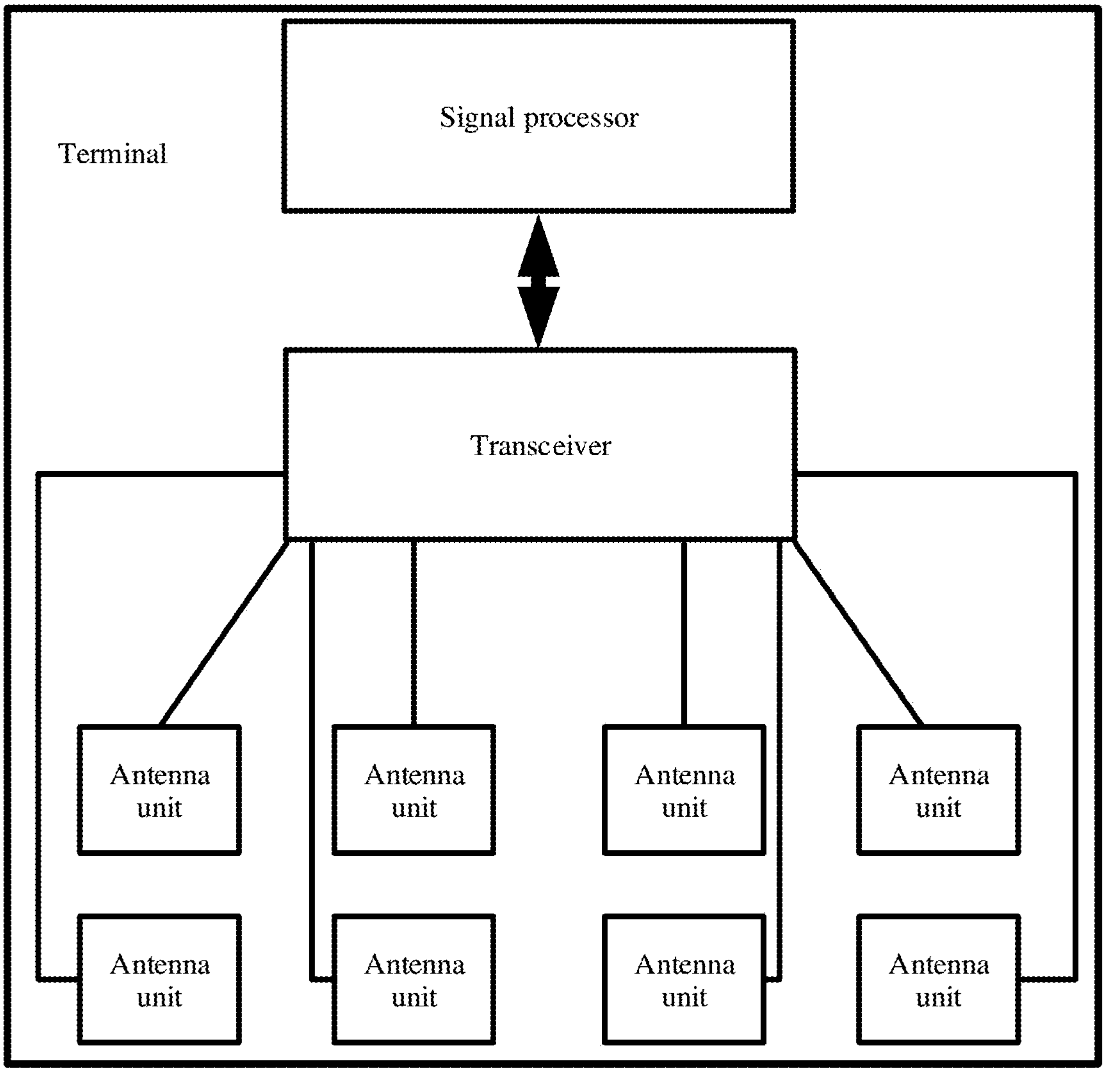
FIG. 2 is a schematic diagram of a functional module of a terminal according to an embodiment of this application.

FIG. 2 is a schematic diagram of a functional module of a terminal according to an embodiment of this application. As shown in FIG. 2, the terminal may include an antenna array, a transceiver, and a signal processor. The antenna array may include a plurality of antenna units that may be arranged as an M×N array, where M and N may each be any integer value. Each antenna unit may be a common patch antenna or an antenna of another type. The transceiver may include a transmitter, configured to: be coupled to the signal processor, process a signal output by the signal processor, and output the signal to the antenna array for transmission. The transceiver may further include a receiver, configured to: process a signal received by the antenna unit, and couple the processed signal to the signal processor for processing.

Further, the receiver in the transceiver may first perform down-conversion processing on a millimeter-wave signal received by the antenna unit, to complete conversion from the millimeter-wave signal to an analog intermediate frequency signal. The down-conversion may be completed by one or more levels of down-conversion. The down-converted signal is filtered to obtain an analog intermediate frequency signal, and the analog intermediate frequency signal is converted into a digital intermediate frequency signal through analog-to-digital conversion.

Further, the transmitter in the transceiver may perform digital-to-analog conversion on the digital intermediate frequency signal from the signal processor to obtain an analog intermediate frequency signal, filter the analog intermediate frequency signal, and then shift the analog intermediate frequency signal from an intermediate frequency band to a millimeter-wave frequency band through up-conversion. The up-conversion process may also be completed by one or more levels of up-conversion. The up-converted signal is amplified and then transmitted by each antenna unit.

Based on a frequency of the analog intermediate frequency signal in the receiver or transmitter, the analog intermediate frequency signal may be a zero intermediate frequency signal or a low intermediate frequency signal.

The signal processor generally implements signal processing in a digital domain, for example, completes digital filtering, digital frequency shifting, encoding, and decoding of a signal.

The signal processor and the transceiver are generally implemented on different chips. For example, a chip implementing a function of the transceiver corresponds to a radio frequency integrated circuit (RFIC), which is also referred to as a radio frequency chip or a transceiver chip. A chip implementing a function of the signal processor corresponds to a baseband integrated circuit (BBIC), and is also referred to as a baseband chip.

Figure 3:
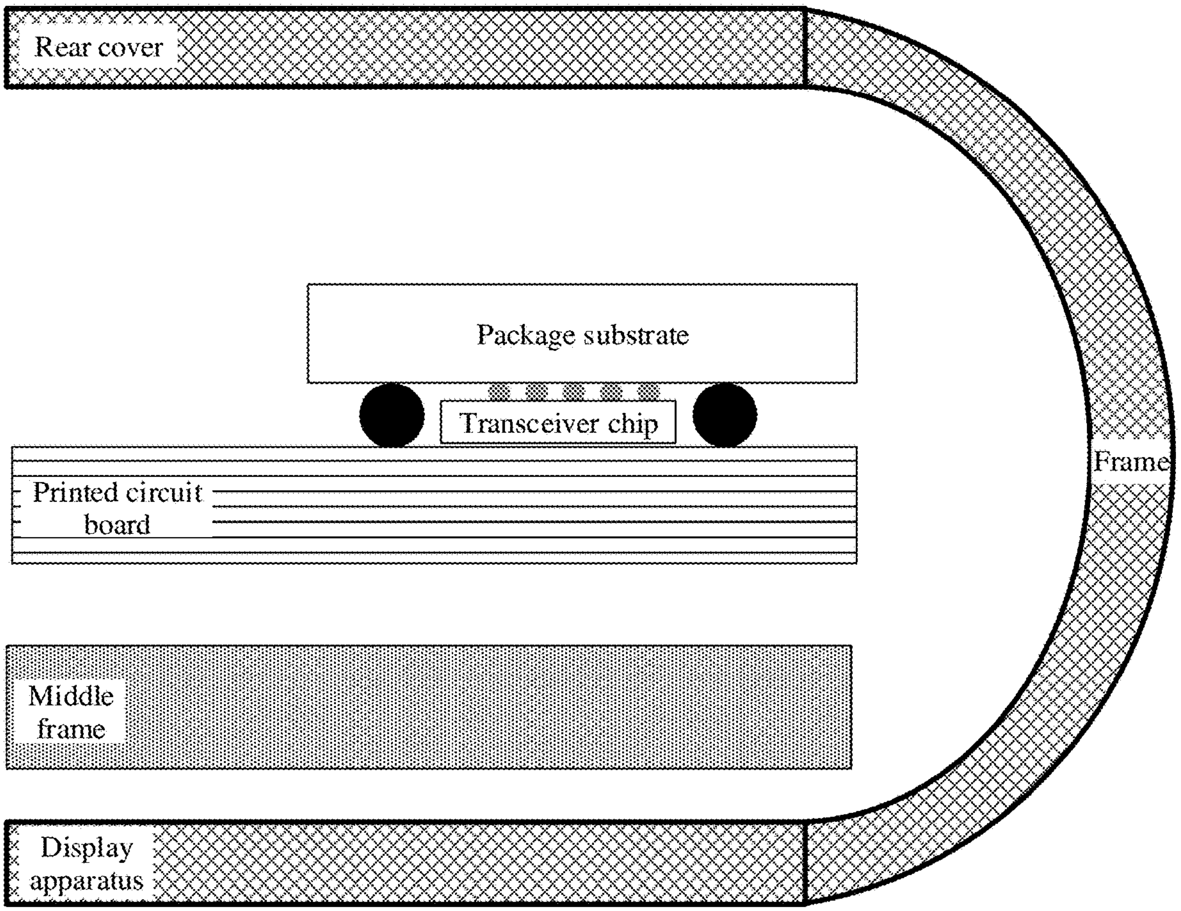
FIG. 3 is a schematic diagram of a cross-section structure of a terminal according to an embodiment of this application.

FIG. 3 is a schematic diagram of a cross-section structure of a terminal according to an embodiment of this application. As shown in FIG. 3, the terminal may include components such as a rear cover, a frame, a display apparatus, and a middle frame. The rear cover and the display apparatus are disposed opposite to each other, and are connected through the frame, to form a cavity between the rear cover and the display apparatus. The middle frame is disposed on a side that is of the display apparatus and that faces toward the rear cover. A package antenna apparatus including a package substrate and a transceiver chip is disposed between the rear cover and the middle frame. Further, the package antenna apparatus may be disposed on a side that is of a printed circuit board (PCB) and that faces toward the rear cover or the frame, and is electrically connected to the PCB through a solder ball or in another manner. This helps reduce interference to a radiation signal of the package antenna apparatus. The package antenna apparatus may be configured to receive, transmit, and process an electromagnetic wave signal.

Figure 4:
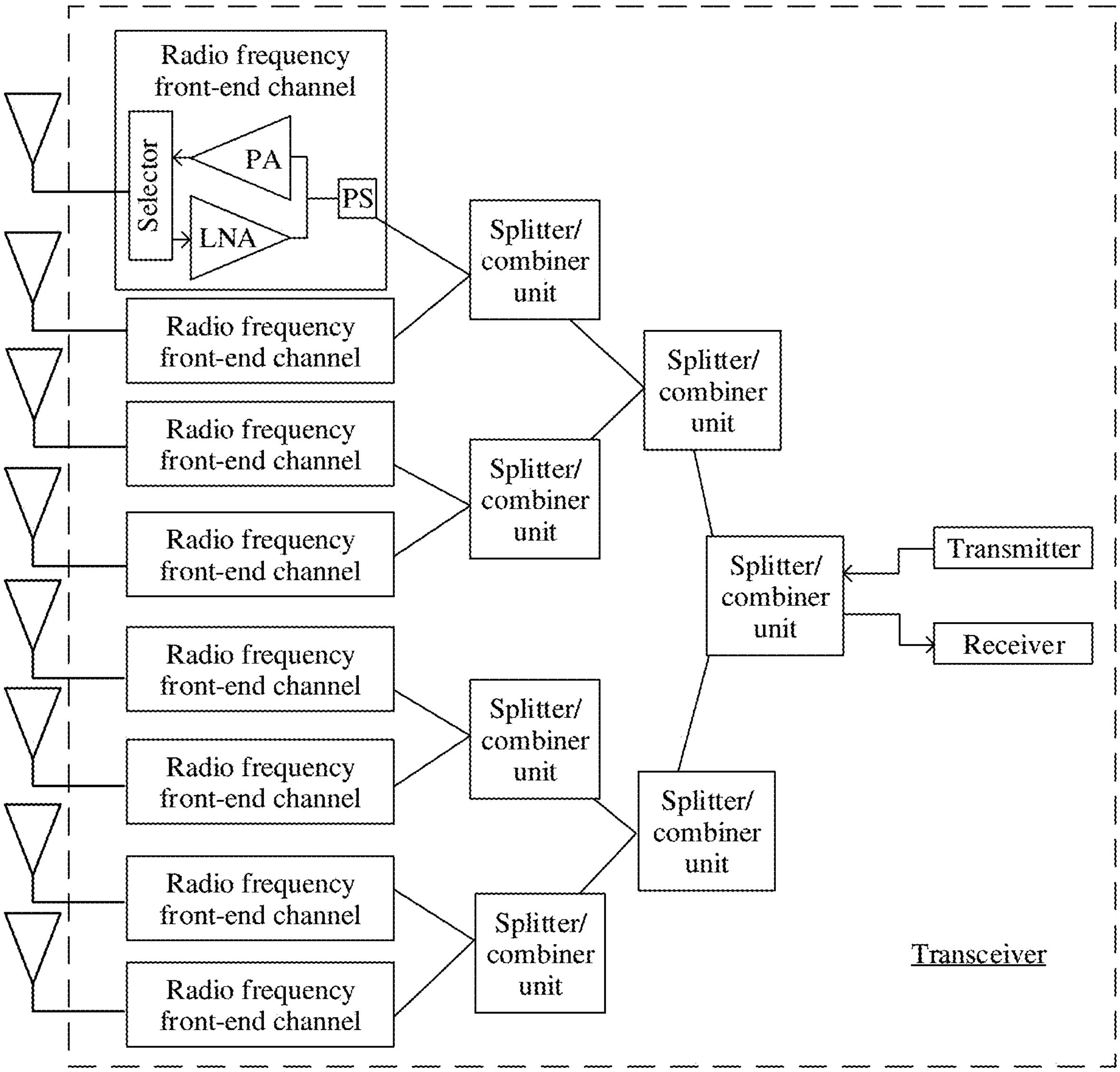
FIG. 4 is a function diagram of a transceiver according to an embodiment of this application.

FIG. 4 is a function diagram of a transceiver according to an embodiment of this application. As shown in FIG. 4, on a basis of the foregoing embodiment, the transceiver includes a transmitter, a receiver, and a plurality of splitter/combiner (S/C) units. The splitter/combiner unit may split signals in a transmit direction and combine signals in a receive direction.

Although FIG. 4 shows only a network of three-level splitter/combiner units, the transceiver in this embodiment of this application may not be limited thereto. The transceiver may also include a network of two-level, four-level, or more-level splitter/combiner units.

Further, the transceiver may further include a plurality of radio frequency front-end channels. The radio frequency front-end channels are coupled to corresponding antenna units, and then the corresponding splitter/combiner units split/combine corresponding transmit signals/receive signals. When the signals are received, the coupled signals from corresponding antennas are processed by the radio frequency front-end channels and then combined and coupled to the receiver through the splitter/combiner units on paths of the corresponding radio frequency front-end channels. When the signals are transmitted, the signals of the transmitter are split to the corresponding radio frequency front-end channels through the splitter/combiner units on corresponding transmit signal paths, and are processed by the radio frequency front-end channels and then transmitted by corresponding antennas.

As shown in FIG. 4, the radio frequency front-end channel may include a selector, a power amplifier (PA) in a transmit direction, a low noise amplifier (LNA) in a receive direction, and a phase shifter (PS).

A specific implementation of the selector may be determined based on a requirement for an operation mode of the radio frequency front-end channel. For example, if the radio frequency front-end channel is in a time division duplex (TDD) operation mode, the selector may be a device with a switch function, for example, a simple single-pole double-position switch that is separately connected to a transmit branch of the PA and a receive branch of the LNA. When the signals are received, the receive branch of the LNA is switched on, and the transmit branch of the PA is switched off. Alternatively, the selector may be a quarter-wave transmission line that is provided with a grounding switch and that may only pass through the receive branch of the LNA. When the signals are received, the grounding switch on the receive branch of LNA is switched off, and the PA is switched off to be in a high impedance mode. When the signals are transmitted, the grounding switch on the receive branch of the LNA is switched on, high impedance is presented by using the quarter-wave transmission line, and the PA is switched on. The selector may be a path isolation design with a similar function, and is configured to implement isolation between the transmit signals and the receive signals based on different transmit and receive moments.

If the radio frequency front-end channel is in a frequency division duplex (FDD) operation mode, the selector may be a device with a filtering function, for example, a combination of a high-pass filter and a low-pass filter or a combination of filters with similar functions. The isolation between the transmit signals and the receive signals is implemented based on different frequency bands on which the radio frequency front-end channels operate. In addition, the selector may alternatively be various combinations of a switch and a filter component, and is selected based on a system requirement.

In the transmit direction, a millimeter-wave signal output by the transmitter is split by the splitter/combiner unit, to obtain output millimeter-wave signals for the plurality of radio frequency front-end channels. In the radio frequency front-end channel, the output millimeter-wave signals may first pass through the phase shifter. Phase-shifted millimeter-wave signals are amplified by the PA to generate transmit millimeter-wave signals. The transmit millimeter-wave signals pass through the selector and are transmitted by the corresponding antenna units. The phase shifters of the different radio frequency front-end channels may generate different phase shifts, so that the antenna units of the different radio frequency front-end channels form a corresponding antenna array to implement beamforming, to obtain a required antenna beam for transmitting signals.

In the receive direction, the antenna units of the radio frequency front-end channels receive signals and then provide the corresponding received millimeter-wave signals for the corresponding radio frequency front-end channels. The millimeter-wave signals entering the radio frequency front-end channels may pass through the selector to reach the low noise amplifier, are amplified by the low noise amplifier, and are phase-shifted by the phase shifter. The phase shifters of the different radio frequency front-end channels may generate different phase shifts, so that the antenna units of the different radio frequency front-end channels form a corresponding antenna array to implement beamforming, to obtain a required antenna beam for receiving signals. The millimeter-wave signals that are in the receive direction of the radio frequency front-end channels and that are phase-shifted by the phase shifter are combined by the splitter/combiner units, and combined millimeter-wave signals are input into the receiver.

Further, a phase of the phase shifter may be further adjusted to implement beam sweeping of the antenna array in the receive direction and beam sweeping of the antenna array in the transmit direction.

Further, the phase shifter is located behind the PA and the LNA, that is, located between the splitter/combiner unit and the PA and the LNA as shown in FIG. 4, or the phase shifter is located between the PA and the LNA and the antenna, for example, located between the antenna and the selector. A specific position of the phase shifter may be determined based on a specific application scenario, a signal sensitivity requirement, and performance and phase shift accuracy of the phase shifter.

Figure 5A:
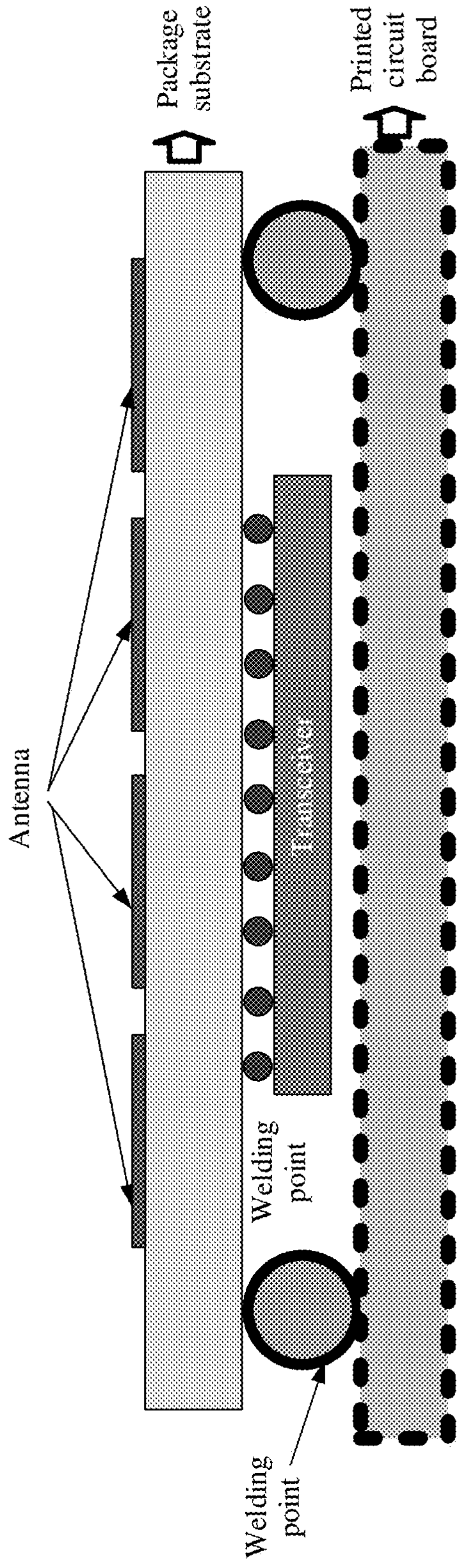

FIG. 5*a* is a schematic diagram of a structure of a welded package antenna apparatus according to an embodiment of this application. According to the foregoing embodiment, this embodiment describes a package antenna apparatus provided with a transceiver chip and a package substrate. To reduce a signal transmission loss and maximize space efficiency, the transceiver uses a package antenna technology. An antenna array and the transceiver chip that integrates all or some functions of the transceiver in FIG. 4 in the foregoing embodiment are packaged in the package antenna apparatus.

The package antenna apparatus may include one package substrate. The package substrate is also referred to as a substrate and is directly configured to carry a chip to support, protect, and cool the chip and also electrically connect the chip to a PCB mother board or another package substrate.

The transceiver chip may be in a die form, or may be in a package form. Correspondingly, a pad of the chip may be a pad of a die of the chip, or may be a pad of a package of the chip. The pad of the package of the chip may be fastened to the package substrate in a manner such as welding, or the pad of the die of the chip may be fastened into the package substrate in a manner such as molding. The fastening manner may be implemented through welding points, for example, solder bumps), or may be another manner implemented through, for example, copper pillars instead of the welding points. The pad of the transceiver chip is structurally packaged on the package substrate, and the transceiver chip is electrically coupled to the antenna array, so that a path for receiving and transmitting a signal between the antenna array and the radio frequency front-end channel can be provided.

The antenna array may be implemented in the package substrate, or the antenna array may be an independent component, and is fastened to the package substrate through molding or welding. The antenna array includes a plurality of antenna units. The antenna unit may be a common one-layer or multi-layer patch antenna or an antenna in another form.

Specifically, as shown in FIG. 5*a*, the transceiver chip may be fastened to a surface of one side of the package substrate through welding, and the antenna array may be implemented by etching one or more metal layers on the other side of the package substrate to form a corresponding shape. Although the transceiver chip and the antenna array shown in FIG. 5*a* are respectively located on two sides of the package substrate, this embodiment may not be limited thereto. The antenna array and the transceiver chip may alternatively be located on a same side of the package substrate.

Figure 5B:
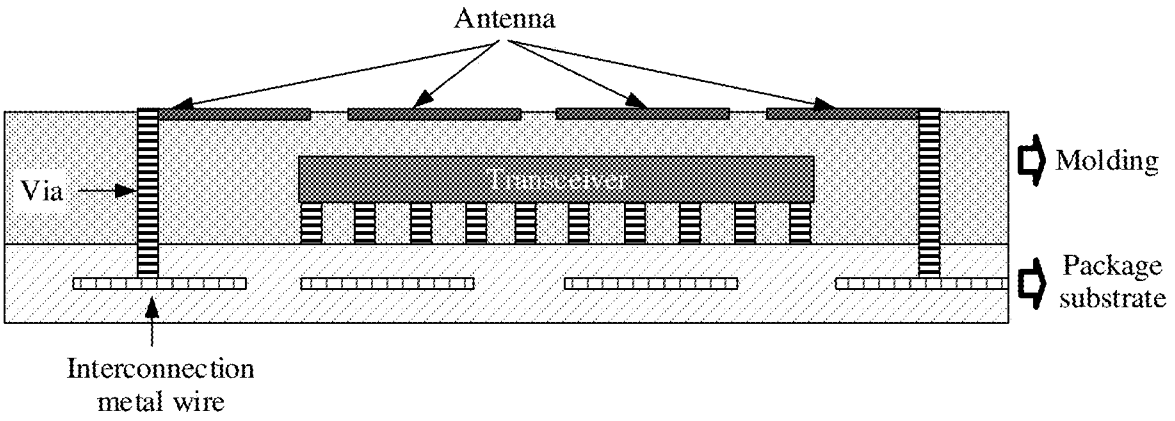

FIG. 5*b* is a schematic diagram of a structure of a molded package antenna apparatus according to an embodiment of this application. As shown in FIG. 5*b*, a transceiver chip may be fastened above a package substrate through molding, and then connected to an interconnection metal wire on the package substrate through a via by using a technology similar to copper pillars. The antenna array is independent of the package substrate, is fastened above a transceiver through molding, and is electrically connected to the package substrate through the via.

The transceiver chip in this embodiment may integrate an entire transceiver functional module described based on the foregoing embodiment, or may integrate only a part of the transceiver functional module. A specific quantity and scale of functional modules integrated into the transceiver chip depend on final cost benefits and performance, for example, factors such as a size and a thickness of the package antenna apparatus, a quantity of ports, a chip area, packaging costs, and cooling.

Further, the package antenna apparatus may be electrically connected to and fastened to a PCB. The fastening manner may be welding and packaging fastening implemented through the solder balls shown in FIG. 5*a*, or may be another existing fastening and packaging manner.

Further, the package antenna apparatus may further include another package substrate. The package substrate is fastened, through welding points, to the package substrate that carries the chip, and is then connected to and fastened to the PCB.

The transceivers shown in FIG. 4, FIG. 5*a*, and FIG. 5*b* are mainly configured to receive and transmit millimeter-wave signals. The transceivers quite differ from an existing 4G transceiver architecture without a filter. This is mainly due to the following reasons:

First, there is currently no other commercial frequency band in the frequency range of the millimeter-wave frequency band, and the millimeter-wave frequency band is far away from other existing commercial frequency bands such as 3G and 4G. Therefore, mutual interference between a signal in the millimeter-wave frequency band and a signal in an existing commercial frequency band is greatly reduced.

Second, due to an inherent physical characteristic of an electromagnetic wave, a transmission attenuation characteristic of the signal in the millimeter-wave frequency band is greatly increased compared with a current RF low frequency band such as 4G and 3G, and a signal transmission distance is greatly reduced. Therefore, medium and long-distance interference caused by a millimeter-wave device to another device is also greatly reduced.

Third, because a multi-level S/C unit phased array architecture shown in FIG. 4 is used, signal energy corresponding to each receiver or transmitter is distributed to a plurality of radio frequency front-end channels. Therefore, compared with conventional 4G and 3G, energy transmitted on a radio frequency front-end channel corresponding to a single antenna unit is greatly reduced, and non-linearity caused by excessively large signal energy of components such as an LNA and a PA on the single radio frequency front-end channel quite less interferes with an out-of-band signal.

In addition to the foregoing factors for reducing both a possibility and intensity of signal interference, no filter is integrated into the transceivers in the foregoing embodiments of this application. This greatly reduces an area and costs of the architecture.

However, this filter-free transceiver architecture also has a corresponding problem that needs to be resolved. First, on a millimeter-wave frequency band, because a communication signal frequency band is widened and a working frequency of a millimeter-wave component is increased, it is much more difficult to design a millimeter-wave circuit and suppress internal interference of the transceivers, and especially design a voltage-controlled oscillator (VCO) in the millimeter-wave frequency band. How to suppress leakage of the VCO on the millimeter-wave frequency band or an interference signal generated by a similar internal circuit is also a great challenge to design of a transceiver. In addition, because a phased array brings the plurality of radio frequency front-end channels, interference between the channels may also be a problem that needs to be resolved. Second, with large-scale commercial use of millimeter waves, overcoming mutual interference between more short-distance millimeter-wave devices may also become a challenge for normal operation of the millimeter-wave devices.

FIG. 6 is a function diagram of another transceiver according to an embodiment of this application. According to the foregoing embodiment, as shown in FIG. 6, the transceiver may further include a first filter. As shown in FIG. 6, the first filter is located between a transmitter and an S/C unit. The first filter that is introduced can reduce interference from an internal circuit in the transceiver, for example, interference from signal leakage of the VCO, interference from the transmitter to a radio frequency front-end channel, and interference in another form. As shown in FIG. 6, a main position of signal energy transmission is between the transmitter and the S/C unit of the first level. Therefore, if an interference signal leaked by the VCO or an interference signal introduced by another similar circuit exists at this position, the interference signal enters each radio frequency front-end channel through the S/C unit of each level, and the interference signal is amplified by a PA and an LNA in each radio frequency front-end channel and then enters an antenna or is received by a chip. Therefore, the first filter that is introduced can improve a signal to noise ratio (S/N) of the internal circuit of the entire transceiver chip.

Further, more interference signals may be generated between more millimeter-wave devices in a short distance, for example, in a larger-scale commercial use scenario of a 5G millimeter-wave frequency band or another similar application scenario. Therefore, with only the first filter, it may be unlikely to meet a requirement of the transceiver chip in a commercial scenario with a higher anti-interference capability requirement. Therefore, in addition to the first filter, a second filter may be further introduced at a position of the second filter, namely, a position between the S/C unit of the first level and the receiver. Compared with the first filter that is mainly configured to suppress interference introduced by a transmitter path, the second filter is mainly configured to filter out interference entering a receiver path. Based on this multi-level S/C unit phased array architecture, on the receiver path, the second filter can more efficiently filter out interference brought by each radio frequency front-end channel to the receiver. The second filter that is introduced may further improve an anti-interference capability of the internal circuit of the entire transceiver chip. Certainly, for a commercial scenario in which transmit signal strength is low and receive signal sensitivity is higher, a millimeter-wave device that is quite sensitive to a quantity of filters may only use the second filter to replace the first filter.

Further, in a scenario with a stricter anti-interference requirement, a filter may also be introduced between different levels of S/C units to achieve a better anti-interference effect on the internal circuit of the transceiver chip.

FIG. 7 is a schematic diagram of a structure of another welded package antenna apparatus. According to the foregoing embodiment, this embodiment describes a package antenna apparatus provided with a transceiver chip and a filter on a package substrate. In this embodiment of this application, the filter may be disposed on the package substrate according to two solutions. In a first solution, the filter is disposed on a material (for example, a metal layer and a dielectric layer) of the package substrate. In a second solution, an existing filter is fastened to a surface of the package substrate or inside the package substrate. The two solutions may have different impact on design and manufacturing of the filter. For example, in the first solution, the filter is disposed on the material of the package substrate. This can further reduce costs of the filter. However, some limitations may be imposed on design and manufacturing of the filter, and the filter depends on a manufacturing process of the package substrate or a package structure. In the second solution, the existing filter is selected. This can improve selection flexibility. Similarly, in this embodiment, the antenna array may also be disposed on the package substrate according to two solutions.

Specifically, the filter may be disposed inside the package substrate, for example, a filter 701 shown in FIG. 7. The filter 701 may be implemented by burying the existing filter inside the package substrate and is namely the filter based on the second solution, or may be implemented by etching metal in the package substrate to form a specific structure and is namely the filter based on the first solution.

The filter may be disposed on the surface of the package substrate, for example, a filter 702 shown in the figure. The filter 702 may be implemented by directly welding the existing filter to the surface of the package substrate in the second solution.

The two manners of implementing the filter on the package substrate can reduce an area and a transmission loss caused by signal routing.

FIG. 8 is a schematic diagram of a structure of another package antenna apparatus according to an embodiment of this application. According to the foregoing embodiment, this embodiment describes a structure of a package substrate provided with a filter. As shown in FIG. 8, a package antenna is disposed on the top of the package substrate. The package substrate includes one or more metal layers and a substrate layer between the metal layers. The package antenna may include a plurality of antenna units. The antenna unit may include a radiating element and a feeder. The radiating element may be a patch antenna, a dipole antenna, a slot antenna, or an antenna in another form. The radiating element may be a one-layer metal structure, and is formed by etching metal of one metal layer. Alternatively, the radiating element may be a multi-layer metal structure, and is formed by etching metal of a plurality of different metal layers.

Further, because a filter is introduced to enhance an anti-interference capability of a transceiver chip, the radiating element may be made into a broadband antenna to receive a millimeter-wave signal on a wider frequency band. Specifically, as shown in FIG. 8, each radiating element may include an upper coupling patch 808 and a lower coupling patch 807. The two patches are respectively located at different metal layers. In a cross-layer coupling patch architecture, compared with a single-layer patch antenna, a bandwidth of a millimeter-wave signal received by the radiating element may be wider, and a communication device based on the package antenna apparatus may cover more millimeter-wave frequency bands.

Further, the package substrate may further include a metal patch 806 that is located between the radiating element and the transceiver chip and configured to provide an antenna ground required by the radiating element and improve signal isolation between the radiating element and the transceiver chip, to reduce mutual crosstalk between the transceiver chip and the antenna.

Although FIG. 8 shows only four radiating elements, a quantity of radiating elements in the antenna array in this embodiment is not limited thereto, and may be more than four. In addition, although only a radiating element is disposed on the top of the package substrate to implement an end-fire function on the top of the package substrate in FIG. 8, this embodiment is not limited thereto. The package antenna apparatus may further dispose a radiating element on a side edge of the package substrate to implement a broadside function of the package substrate.

A part of the metal layer at which the feeder of the radiating element is located is located between a part of the metal layer at which the radiating element is located and the transceiver chip. The part of the metal layer at which the feeder of the radiating element is located may include one or more metal layers, and a substrate layer located between the metal layers. In consideration of performance, a dielectric material used in the part of the metal layer at which the feeder of the radiating element is located may be different from a dielectric material used in the part of the metal layer at which the radiating element is located. To implement a larger bandwidth and higher radiation efficiency of the antenna, the part of the metal layer at which the radiating element is located may use a material with a low dielectric constant, for example, a material with a dielectric constant less than 3 based on a requirement. To implement a small area and a small transmission loss, the metal layer at which the feeder is located may use a material with a high dielectric constant, for example, a material with a dielectric constant greater than 3 based on a requirement. In consideration of costs, the metal layer at which the feeder is located may alternatively use the same dielectric material as an antenna layer.

The metal layer at which the feeder is located includes a feed network. The feed network is coupled to the transceiver chip and the antenna, and is configured to implement feeding of a signal of the transceiver chip to the antenna. The feeding manner may include probe feeding, and may include another feasible antenna feeding manner such as slot coupling feeding. Specifically, the feed network may include a plurality of feeders. One end of the feeder is coupled to the corresponding radiating element in the antenna array, and the other end of the feeder is coupled to a port of a corresponding radio frequency front-end channel in the transceiver chip, to establish a signal path for transmitting a signal or receiving a signal between each radio frequency front-end channel and the corresponding radiating element. For example, specifically, as shown in FIG. 8, one end of a feeder 802 is electrically connected to an antenna port 801 of the transceiver chip through a welding point, and the other end feeds the patch 807 through a first via (Via 1), a metal line (Line 1), and a second via (Via 2).

Further, the package substrate may further include a filter. The filter shown in FIG. 8 is disposed at the metal layer of the package substrate. Although FIG. 8 shows only one filter, the package substrate may not be limited thereto. The metal layer at which the feeder is located further includes two or more filters. Although the filter shown in FIG. 8 includes only two dielectric layers and three metal layers, similarly, the filter in this embodiment may not be limited thereto, and may include more dielectric layers and metal layers. FIG. 8 is only a schematic diagram. To implement interconnection between the filter and the transceiver chip, and in particular, to implement a first filter, a second filter, or a filter between different levels of S/C units described in the foregoing embodiments of this application, the transceiver chip needs to specially stretch out two pads. A pad 804 and a pad 805 are coupled to an input port and an output port of the filter respectively. Specifically, as shown in FIG. 8, the pad 804 and the pad 805 of the transceiver chip are connected to the input port and the output port of the filter through welding points.

Further, because a signal transmitted in the filter is input into the transceiver chip again, in addition to a filtering function, the filter may also have an anti-interference capability to some extent. This reduces interference signals entering the transceiver chip through the filter. Specifically, a filter 803 may further include a metal ground 809, a metal ground 810, and a via 811. The via 811, the metal ground 809, and the metal ground 810 form a metal cavity, to optimize isolation between a signal transmitted in the filter and the outside.

FIG. 9 is a schematic diagram of a structure of a filter according to an embodiment of this application. According to the foregoing embodiment, the filter may be a band-pass filter, a band-stop filter, a low-pass filter, a high-pass filter, or another type of filter with a similar function.

Specifically, as shown in FIG. 9, the filter may include a metal ground 905, a metal ground 901, and a filtering network. The metal ground 905 and the metal ground 901 are located at a first metal layer I and a fifth metal layer V respectively. The first metal layer and the fifth metal layer are located at an upper layer and a lower layer of the filter respectively, so that the filtering network is located between the two metal ground.

Further, the filter may further include one or more metal vias 914. The metal via 914 is located around the filter and electrically connects the metal ground 901 to the metal ground 905 to form a shielding metal cavity, to reduce interference between the filter and another circuit.

The filtering network may include a filter circuit located at one or more metal layers. Different structures of the filter circuit may implement different filtering functions of the filter.

Further, as shown in FIG. 9, the filtering network may include a transmission circuit 903. The transmission circuit 903 is located at a second metal layer II. The transmission circuit 903 may be configured to design a main transmission passband characteristic of the filter. Specifically, the transmission circuit may include an input port 912, an output port 913, and a transmission line structure 911 in between. The input port 912 and the output port 913 may be located on two sides of the transmission circuit, to facilitate cascading with another radio frequency module. The transmission line structure 911 may be a 50-ohm transmission line that is bent back and forth in space layout, to help minimize a size of the circuit and generate a required main passband and stopband frequency characteristic.

Further, the filtering network may further include a resonant circuit. The resonant circuit and the transmission circuit are located at different metal layers. Through inter-layer coupling of the resonant circuit and the transmission circuit, the passband and stopband characteristic of the filter is further adjusted.

Specifically, the resonant circuit may include a first resonator 904. The first resonator 904 is located between the transmission circuit and the metal ground. The first resonator 904 is located at a third metal layer III.

Preferably, as shown in FIG. 9, the first resonator 904 may include one or a plurality of transmission line resonators, such as 907, 908, 909, and 910 in the figure. One end of the transmission line is open-circuited, and the other end is short-circuited. The short-circuited end is directly connected to a metal strip around the transmission line. The metal strip is connected to a metal ground through a plated through hole 914. The plurality of transmission line resonators 907 to 910 are bent back and forth on a same metal layer, and are connected in sequence. A function of this layout is to minimize a size of the resonator. A length of the transmission line resonator may determine a location of a transmission zero, namely a stopband frequency band. A stopband may be adjusted to move to a high frequency band by reducing the length of the resonator. The transmission line resonators 907 to 910 may be directly coupled to each other. A value of a coupling coefficient between adjacent resonators is related to a spacing between the resonators. A larger distance indicates weaker coupling strength. In addition, inter-level coupling strength may also be adjusted by changing level distribution of the resonators.

Preferably, the transmission line resonator 907 to 910 may be coupled to the transmission line structure 911 in the transmission circuit 903 in a broadside manner. In a coupling region, the resonators 907 to 910 correspond to the transmission line structure 911 up and down. A coupling length or a corresponding area affects feeding strength of the transmission line structure 911 to the resonators 907 and 910. A larger corresponding area indicates higher feeding strength. The broadside coupling manner helps enhance feeding and improve stopband suppression, and the layered circuit distribution further reduces a size of the circuit.

Further, the resonant circuit may include a second resonator 902. The second resonator 902 is located between the first resonator 904 and the metal ground 901. The second resonator 902 is located at a fourth metal layer IV. The fourth metal layer is located between the third metal layer and the fifth metal layer.

Preferably, the second resonator 902 may be a patch with a hole or a patch structure in another shape. The second resonator 902 may further adjust and optimize the passband and stopband characteristic of the filter based on the first resonator 904.

Specifically, as shown in FIG. 9, the second resonator 902 includes a central square hole 906 that is located right below the transmission line resonators 908 and 909 of the resonator 903. The hole changes a part of a length, an impedance value, and an equivalent series capacitance value of the resonators 908 and 909. A larger hole size corresponds to an increase in the impedance value of the resonator and a decrease in the equivalent series capacitance value, and a location of a transmission zero generated by the resonators 908 and 909 moves towards a high frequency. In addition, the hole enhances feeding of the transmission line structure 911 to the resonators 908 and 909. Therefore, a size of the hole may be changed to help adjust the location of the transmission zero, feeding strength, and passband matching of the filter.

Further, the filter may use a high density interconnection (HDI) processing technology. The HDI technology includes an inner layer circuit and an outer layer circuit, and then uses a drilling process and an in-hole plating process to connect the circuits. The via in the HDI technology may be implemented in a form of a buried via and a blind via. These two types of vias are special types brought by the HDI technology. The buried via is a hole buried in an inner layer and cannot be seen in a finished product. The buried via is mainly configured to conduct the inner layer circuit, to reduce a probability of signal interference and maintain continuity of characteristic impedance of the transmission line. Because the buried via does not occupy a surface area of a PCB, more components may be placed on the surface of the PCB. The blind via is a via that connects a surface layer to an inner layer but does not run through the entire board.

FIG. 10 is a schematic diagram of a structure of another filter according to an embodiment of this application. Similar to an overall structure of the filter in the embodiment shown in FIG. 9, the filtering network includes a transmission circuit 1003 and two resonators: a first resonator 1002 and a second resonator 1004. The two resonators are respectively located on an upper side and a lower side of the transmission circuit 1003. The transmission circuit 1003 is located at a third metal layer III and has a structure the same as a structure of the transmission circuit 1003 shown in FIG. 9 in the foregoing embodiment, and is configured to implement the main passband and stopband characteristic of the filter. Similarly, the first resonator 1002 and the second resonator 1004 further adjust the passband and stopband characteristic of the filter through inter-layer coupling with the transmission circuit 1003.

The first resonator 1002 is located at a second metal layer, and includes transmission line resonators 1007 and 1010 and a metal patch 1006. The transmission line resonators 1007 and 1010 are located on two sides of the metal patch 1006 through slot coupling. The second resonator 1004 is located at a fourth metal layer, and includes transmission line resonators 1008 and 1009 that are coupled to each other through a slot. The transmission line resonators 1008 to 1009 and 1007 to 1010 in the first resonator 1002 and the second resonator 1004 are disposed at different metal layers on two sides of the transmission circuit, to further reduce coupling strength between the two transmission line resonators and implement higher stopband suppression performance.

FIG. 11 is a schematic diagram of an implementation structure of a transmission circuit according to an embodiment of this application. According to the foregoing embodiment, the transmission circuit 1003 or 903 in the filter in the foregoing embodiments may alternatively be of a structure of a transmission circuit 104 shown in FIG. 11. The transmission circuit 104 includes a plurality of transmission lines that are located between an input port and an output port and that are bent back and forth. Specifically, the transmission circuit 104 includes transmission line resonators **104*a*, 104*b*, 104*c*, 104*d*, and 104*e***.

The transmission line resonator **104*a* is in a horizontal E shape, and includes three stub lines: a first stub line 104*a*1, a second stub line 104*a*2, and a third stub line 104*a*3. The second stub line 104*a*2 and the third stub line 104*a*3 are symmetrical with respect to the first stub line 104*n*. The transmission line resonator 104*a* may implement a transmission zero, namely a stopband frequency. The transmission zero may be adjusted by adjusting lengths of the three stub lines. A transmission line structure of the transmission line resonator 104*a* is in a U shape, and includes a stub line 104*a*4 and a stub line 104*a*5. The stub line 104*a*4 and the stub line 104*a*5 are symmetrical with respect to the first stub line 104*a*1. The passband characteristic of the filter can be controlled by adjusting the lengths of the stub line 104*a*4 and the stub line 104*a*5**.

The two transmission line resonators **104*b* and 104*c* are both in a U shape and are symmetrical with respect to the first stub line 104*a*1. The transmission line resonator 104*b* includes a stub line 104*b*1 and a stub line 104*b*2. The transmission line resonator 104*c* includes a stub line 104*c*1 and a stub line 104*c*2. The stub line 104*b*1 is close to the stub line 104*a*4, to form a first coupling region. The stub line 104*c*1 is close to the stub line 104*a*5**, to form a second coupling region.

A first feed line **104*d* at an input port is perpendicularly connected to the stub line 104*b*1. A second feed line 104*e* at an output port is perpendicularly connected to the stub line 104*c*1. The input port and the output port are symmetrical with respect to the first stub line 104*a*1. Feeding strength may be adjusted by adjusting a distance between the feed line and a joint of the stub lines. The characteristic of the filter may be implemented by adjusting coupling and feeding strength. Different coupling and feeding combinations may implement passband filtering responses with different center frequencies and bandwidths. The transmission circuit 104 may form a filtering network together with the resonator in FIG. 10 or FIG. 9**, or may form a filtering network alone.

FIG. 12 is a schematic diagram of an implementation structure of a resonator according to an embodiment of this application. According to the foregoing embodiment, the resonator in the foregoing embodiment may alternatively be a resonator 1201 shown in FIG. 12. The resonator 1201 includes a metal patch 1202 and a metal patch 1203. Preferably, the metal patches 1202 and 1203 may be rectangular. The resonator 1201 may be coupled to the transmission circuit in the foregoing embodiment in an inter-layer manner to form a filtering network. For example, the resonator 1201 in this embodiment and the transmission circuit 104 in the foregoing embodiment may be disposed at different metal layers to jointly form a filtering network. The metal patch 1102 and the metal patch 1203 in the resonator 1201 may be symmetrical with respect to the first stub line 104*a*1 shown in the transmission circuit 104. The two metal patches may be coupled to the transmission circuit in an inter-layer manner, to adjust a transmission characteristic of the filter.

FIG. 13 is a schematic diagram of a structure of another transmission circuit according to an embodiment of this application. According to the foregoing embodiment, the transmission circuit may include two parts: a first transmission circuit and a second transmission circuit. The first transmission circuit and the second transmission circuit are connected in parallel. The two transmission circuits are respectively located at different metal layers.

As shown in FIG. 13, the first transmission circuit and the second transmission circuit may be transmission line resonators loaded with open-circuited stubs. The first transmission circuit and the second transmission circuit may adjust positions and lengths of the open-circuited stubs, to adjust a transmission characteristic. Further, the two transmission circuits may work together in parallel to obtain a required passband response of the filter.

Specifically, the first transmission circuit may be formed by sequentially connecting a first transmission line (TL1: transmission line 1), a second transmission line (TL2), a third transmission line (TL3), a fourth transmission line (TL4), a fifth transmission line (TL5), and a sixth transmission line (TL6). The second transmission line (TL2) is connected in parallel between the first transmission line (TL1) and the third transmission line (TL3). The fourth transmission line (TL4) and the fifth transmission line (TL5) are connected in parallel between the third transmission line (TL3) and the sixth transmission line (TL6). The transmission line TL1 and the transmission line TL6 are connected to an input port P1 and an output port P2 respectively.

The second transmission circuit may be formed by sequentially connecting a seventh transmission line (TL7), an eighth transmission line (TL8), a ninth transmission line (TL9), a tenth transmission line (TL10), an eleventh transmission line (TL11), and a twelfth transmission line (TL12). The eighth transmission line (TL8) and the ninth transmission line (TL9) are connected in parallel between the seventh transmission line (TL7) and the tenth transmission line (TL10). The eleventh transmission line (TL11) is connected in parallel with the tenth transmission line (TL10) and the twelfth transmission line (TL12). The transmission line TL6 and the transmission line TL1 are connected to the input port P1 and the output port P2 respectively.

The first transmission circuit and the second transmission circuit are connected in parallel between the input port P1 and the output port P2.

It should be understood that the term "coupling" in this application is used to indicate interworking or interaction between different components, and may include a direct connection or an indirect connection performed by using another component. In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B each may be singular or plural. The character "/" generally represents an "or" relationship between associated objects.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A package antenna apparatus, comprising:

a package substrate, wherein an antenna array is disposed on a first surface of the package substrate;

a transceiver chip coupled to the antenna array, wherein the transceiver chip is fastened to a second surface of the package substrate that is opposite from the first surface of the package substrate, and wherein the transceiver chip comprises a first pad and a second pad; and a filter disposed in the package substrate, wherein the filter comprises an input port and an output port, wherein the input port is coupled to the first pad of the transceiver chip, the output port is coupled to the second pad of the transceiver chip, and wherein the filter is configured to filter a signal of the transceiver chip that is input through the input port, and is further configured to output a filtered signal to the transceiver chip through the output port, wherein the filter is disposed within the package substrate between the first surface and the second surface.

2. The package antenna apparatus according to claim 1, wherein the package substrate comprises a plurality of metal layers, and wherein the filter is disposed in the plurality of metal layers.

3. The package antenna apparatus according to claim 2, wherein the plurality of metal layers comprise a first metal layer part and a second metal layer part, and wherein the second metal layer part is located below the first metal layer part; and wherein a plurality of radiating elements of the antenna array are disposed in the first metal layer part, wherein the filter is disposed in the second metal layer part, and wherein the transceiver chip is fastened below the second metal layer part.

4. The package antenna apparatus according to claim 2, wherein the filter comprises a filter circuit and a metal ground; and wherein the filter circuit and the metal ground are disposed at different metal layers of the package substrate, wherein the metal ground comprises a first metal ground and a second metal ground, wherein the first metal ground is disposed at a metal layer above a metal layer at which the filter circuit is located, and wherein the second metal ground is disposed at a metal layer below the metal layer at which the filter circuit is located.

5. The package antenna apparatus according to claim 4, wherein a metal via is disposed in the metal layer at which the filter is located, and wherein the metal via connects the first metal ground to the second metal ground; and wherein the metal via, the first metal ground, and the second metal ground form a metal cavity, and wherein the filter circuit is located in the metal cavity.

6. The package antenna apparatus according to claim 4, wherein the filter circuit comprises a transmission circuit, wherein one end of the transmission circuit is connected to the input port, wherein a second end of the transmission circuit is connected to the output port, wherein a transmission line structure is disposed on the transmission circuit, and wherein the transmission line structure is bent between the input port and the output port.

7. The package antenna apparatus according to claim 6, wherein the transmission line structure comprises a first transmission line stub, a second transmission line stub, and a third transmission line stub; and wherein the first transmission line stub and the third transmission line stub are coupled to the second transmission line stub through a slot, and are symmetrical with respect to the second transmission line stub.

8. The package antenna apparatus according to claim 6, wherein the transmission line structure disposed on the transmission circuit comprises a first transmission line circuit and a second transmission line circuit;

wherein the first transmission line circuit and the second transmission line circuit each comprise a plurality of open-circuited transmission line stubs connected in parallel between head-to-tail connected transmission lines;

wherein the first transmission line circuit and the second transmission line circuit are connected in parallel; and wherein the first transmission line circuit and the second transmission line circuit are separately located at different metal layers.

9. The package antenna apparatus according to claim 6, wherein the filter circuit further comprises a resonator, and wherein the resonator and the transmission circuit are separately located at different metal layers.

10. The package antenna apparatus according to claim 9, wherein the resonator comprises at least one of a hole patch or a metal patch, and wherein the at least one of the hole patch or the metal patch is disposed at a metal layer between a metal layer at which the metal ground is located and a metal layer at which the transmission circuit is located.

11. The package antenna apparatus according to claim 1, wherein the transceiver chip comprises a receiver, a transmitter, a splitter/combiner unit separately coupled to the receiver and the transmitter, and a plurality of radio frequency front-end channels coupled to the splitter/combiner unit; and wherein the plurality of radio frequency front-end channels of the transceiver chip is coupled to the antenna array.

12. The package antenna apparatus according to claim 11, wherein the first pad is coupled to the transmitter, wherein the second pad is coupled to the splitter/combiner unit, and wherein the filter is coupled between the transmitter and the splitter/combiner unit through the first pad and the second pad.

13. The package antenna apparatus according to claim 11, wherein the first pad is coupled to the receiver, wherein the second pad is coupled to the splitter/combiner unit, and wherein the filter is coupled between the receiver and the splitter/combiner unit through the first pad and the second pad.

14. A wireless communication apparatus, comprising:

a baseband chip; and a package antenna apparatus, comprising:

a package substrate, wherein an antenna array is disposed on a first surface of the package substrate; and a transceiver chip coupled to the antenna array, wherein the transceiver chip is fastened to a second surface of the package substrate that is opposite from the first surface of the package substrate, and wherein the transceiver chip comprises a first pad and a second pad; and a filter disposed in the package substrate, wherein the filter comprises an input port and an output port, wherein the input port is coupled to the first pad of the transceiver chip, wherein the output port is coupled to the second pad of the transceiver chip, and wherein the filter is configured to filter a signal of the transceiver chip that is input through the input port, and is further configured to output a filtered signal to the transceiver chip through the output port, wherein the filter is disposed within the package substrate between the first surface and the second surface; and wherein the baseband chip is coupled to the transceiver chip in the package antenna apparatus.

15. The wireless communication apparatus according to claim 14, further comprising:

a printed circuit board, wherein the package antenna apparatus is fastened to the printed circuit board.

16. The wireless communication apparatus according to claim 15, further comprising:

a rear cover, wherein a package structure is fastened to a side of the printed circuit board that faces toward the rear cover.

17. The wireless communication apparatus according to claim 14, wherein the package substrate comprises a plurality of metal layers, and wherein the filter is disposed in the plurality of metal layers.

18. The wireless communication apparatus according to claim 17, wherein the plurality of metal layers comprise a first metal layer part and a second metal layer part, and wherein the second metal layer part is located below the first metal layer part; and wherein a plurality of radiating elements of the antenna array are disposed in the first metal layer part, wherein the filter is disposed in the second metal layer part, and wherein the transceiver chip is fastened below the second metal layer part.

19. The wireless communication apparatus according to claim 17, wherein the filter comprises a filter circuit and a metal ground; and wherein the filter circuit and the metal ground are disposed in different metal layers of the package substrate, wherein the metal ground comprises a first metal ground and a second metal ground, wherein the first metal ground is disposed in a metal layer above a metal layer in which the filter circuit is located, and wherein the second metal ground is disposed in a metal layer below the metal layer in which the filter circuit is located.

20. The wireless communication apparatus according to claim 19, wherein a metal via is disposed in the metal layer in which the filter is located, and wherein the metal via connects the first metal ground to the second metal ground; and wherein the metal via, the first metal ground, and the second metal ground form a metal cavity, and wherein the filter circuit is located in the metal cavity.

* * * * *